(12) United States Patent
Halberstadt

(10) Patent No.: US 10,734,887 B1
(45) Date of Patent: Aug. 4, 2020

(54) POWER FACTOR CORRECTOR CIRCUIT WITH DISCONTINUOUS AND CONTINUOUS CONDUCTION MODES BASED ON A DESIRED SWITCHING FREQUENCY AND AN INPUT CURRENT

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/457,800

(22) Filed: Jun. 28, 2019

(51) Int. Cl.
*H02M 1/42* (2007.01)
*H02M 7/217* (2006.01)

(52) U.S. Cl.
CPC ......... *H02M 1/4225* (2013.01); *H02M 7/217* (2013.01)

(58) Field of Classification Search
CPC ............................ H02M 1/4225; H02M 7/217
See application file for complete search history.

(56) References Cited

U.S. PATENT DOCUMENTS

| | | |
|---|---|---|
| 8,351,232 B2 | 1/2013 | Zhang |
| 8,599,579 B2 | 12/2013 | Kuebrich et al. |
| 9,479,046 B2 | 10/2016 | Lin et al. |
| 9,621,028 B2 | 4/2017 | Lin et al. |
| 2014/0097808 A1* | 4/2014 | Clark ................ G05F 1/70 323/208 |
| 2014/0252990 A1* | 9/2014 | Maru ............. H02M 3/33507 315/307 |
| 2015/0303790 A1* | 10/2015 | Lin ................... H02M 1/4225 363/89 |

OTHER PUBLICATIONS

Power Factor Correction, "Improving Efficiency and Power Factor at Light Load", Issue 3, 2016 Power Electronics Europe, www.power-mag.com, 3 pgs., 2016.
On Semiconductor, "Power Factor Correction Stages Operating in Critical Conduction Mode", AND8123/D, Nov. 2014, Rev. 2, 18 pgs., 2014.
Monolithic Power Systems, "MPS HR1200: PFC + LLC Combo Controller", 30 pgs., Jan. 7, 2016.
Wikipedia, "Mains electricity", retrieved from the internet at https://en.wikipedia.org/wiki/Mains_electricity, on Oct. 9, 2018, 9 pgs.
Monolithic Power Systems, "HR1200 High Performance PFC + LLC Combo Controller", 34 pgs., 2017.

* cited by examiner

*Primary Examiner* — Harry R Behm

(57) ABSTRACT

Embodiments of a method and a device are disclosed. A circuit can include a power factor corrector, wherein two or more desired input variables can be defined for the power factor corrector, and a processor that communicates with the power factor corrector, and which selects variables in the power factor corrector with respect to the two or more desired input variables defined for the power factor corrector. The two or more desired input variables can include a switching frequency and an input current and the variables can include an amount of operation in a conduction mode and at least one of a primary peak current and a primary conduction interval. The variables in the power factor corrector can be adapted to the two or more desired input variables to allow the power factor corrector to operate in an operating mode that can include the conduction mode.

18 Claims, 26 Drawing Sheets

$$\begin{bmatrix} \Delta \text{Iav\_in} = \dfrac{\delta \text{Iav\_in}}{\delta a} \cdot da + \dfrac{\delta \text{Iav\_in}}{\delta \text{Ipeak}} \cdot d\text{Ipeak} \\ \Delta \text{Fswitch} = \dfrac{\delta \text{Fswitch}}{\delta a} \cdot da + \dfrac{\delta \text{Fswitch}}{\delta \text{Ipeak}} \cdot d\text{Ipeak} \end{bmatrix} \diagup 380$$

FIG. 12

$$382 \left\{ \begin{array}{l} \text{Iav\_in} - \text{Iin\_desired} = \dfrac{\delta \text{Iav\_in}}{\delta a} \cdot da + \dfrac{\delta \text{Iav\_in}}{\delta \text{Ipeak}} \cdot d\text{Ipeak} \\ \text{Fswitch} - \text{Fswitch\_desired} = \dfrac{\delta \text{Fswitch}}{\delta a} \cdot da + \dfrac{\delta \text{Fswitch}}{\delta \text{Ipeak}} \cdot d\text{Ipeak} \end{array} \right.$$

FIG. 13

$$\begin{bmatrix} \left( \dfrac{Iav\_in - Iin\_desired}{Fswitch - Fswitch\_desired} \right) \end{bmatrix} = \begin{pmatrix} \dfrac{\delta Iav\_in}{\delta a} & \dfrac{\delta Iav\_in}{\delta Ipeak} \\ \dfrac{\delta Fswitch}{\delta a} & \dfrac{\delta Fswitch}{\delta Ipeak} \end{pmatrix} \cdot \begin{bmatrix} \begin{pmatrix} da \\ dIpeak \end{pmatrix} \end{bmatrix}$$

FIG. 14

$$da = \frac{\begin{pmatrix} Iav\_in - Iin\_desired \\ Fswitch - Fswitch\_desired \end{pmatrix}}{\begin{pmatrix} \dfrac{\delta Iav\_in}{\delta a} & \dfrac{\delta Iav\_in}{\delta Ipeak} \\ \dfrac{\delta Fswitch}{\delta a} & \dfrac{\delta Fswitch}{\delta Ipeak} \end{pmatrix}} \quad \text{386}$$

FIG. 15

$$dI_{peak} = \begin{bmatrix} \dfrac{\delta Iav\_in}{\delta a} & Iav\_in - Iin\_desired \\ \dfrac{\delta Fswitch}{\delta a} & Fswitch - Fswitch\_desired \end{bmatrix} \begin{bmatrix} \dfrac{\delta Iav\_in}{\delta a} & \dfrac{\delta Iav\_in}{\delta Ipeak} \\ \dfrac{\delta Fswitch}{\delta a} & \dfrac{\delta Fswitch}{\delta Ipeak} \end{bmatrix}$$

FIG. 16

$$\begin{bmatrix} \dfrac{\delta I_{av\_in}}{\delta a} \\ \dfrac{\delta F_{switch}}{\delta a} \end{bmatrix} = \dfrac{\delta I_{av\_in}}{\delta a} - \dfrac{\delta I_{av\_in}}{\delta I_{peak}} \cdot \dfrac{\delta F_{switch}}{\delta I_{peak}} \cdot \dfrac{\delta F_{switch}}{\delta a} \cdot \delta a$$

$$392 \rightarrow \begin{bmatrix} \left( \dfrac{\text{Iav\_in} - \text{Iin\_desired}}{\dfrac{\delta \text{Iav\_in}}{\delta \text{Ipeak}}} \right) \\ \left( \dfrac{\text{Fswitch} - \text{Fswitch\_desired}}{\dfrac{\delta \text{FSwitch}}{\delta \text{Ipeak}}} \right) \end{bmatrix}$$

FIG. 18

POWER FACTOR CORRECTOR CIRCUIT WITH DISCONTINUOUS AND CONTINUOUS CONDUCTION MODES BASED ON A DESIRED SWITCHING FREQUENCY AND AN INPUT CURRENT

BACKGROUND

General electric alternating-current (AC) power ("mains power" or "mains electricity") may need to be converted into direct-current (DC) power for use by a multitude of consumer devices. A power management system can convert AC power from the main source into DC power using components such as, for example, inductors, diodes, capacitors, transformers and other switches (e.g., unction gate field-effect transistors, metal-oxide semiconductor field-effect transistors, etc.) with low losses in power dissipation. Losses in the main source may be decreased by focusing on the harmonics of the current drawn from the main source and the phase relationship between the mains voltage and the current drawn from the main source. The power factor of an AC to DC electric power system may be defined as the ratio of the real power drawn from the main source compared to the product of the root means square (rms) voltage '$V_{rms}$' and the rms current '$I_{rms}$'. The power factor therefore indicates how much more RMS (Root Mean Square) current can be taken from the mains compared to the optimum, and therefore indicates the losses in wires of the mains grid related to the optimum situation.

A power factor corrector (PFC), which may include a bridge rectifier, a switch-mode power supply (SMPS), and control circuits, can be used to help maximize the power factor in power management systems and can also be used for power management in personal computers, adapters, lighting and so on. A power factor can therefore function as a parameter used in evaluating the overall performance of a power factor corrector.

PFC circuits can be used in applications such as power converters to control the phase of the input current and help maximize power in power management systems. A power factor corrector (also referred to as "PFC circuit" or simply as a "PFC") may be needed for a SMPS to operate with power levels above, for example, 75 watts. For a power level above approximately 300 watts, a CCM (Continuous-Conduction Mode) operation can become attractive because this can lead to the use of small EMI (Electromagnetic Interference) filters, which are useful in smaller electronic devices.

Traditional PFC circuits may use fixed frequency in CCM applications. Close to the main zero-crossing, however CCM may not be maintained, and a changeover from a BCM (Boundary Conduction Mode) to a (Discontinuous-Conduction Mode) DCM can occur in association with a rising frequency. Unfortunately, this feature can result in a lower efficiency close to the main zero-crossing.

For optimum efficiency, it may be advantageous to use CCM at higher power levels around the peak voltage of the main power supply and then use DCM in other situations.

Some DCM applications may employ a topology involving 'Ton' ('On Time') control for the PFC switch. 'Ton' control offers the advantage for BCM of automatically correcting the mains current shape for a high power factor. This is because $di/dt=V_{mains}/L_{ind}$, wherein $L_{ind}$ is the main inductor value. Thus with a fixed 'Ton', the primary peak current is proportional to the momentary mains voltage. For CCM, the primary current may depend on the current at the end of the previous switching cycle and the switch conduction interval 'Ton'. Therefore, on time control in the manner used in DCM cannot be employed in CCM operations.

Some CCM operational techniques may use a method referred to as "average current control". This approach can be based on the fact that the duty cycle of the secondary stroke equals $V_{in}/V_{out}$ where $V_{in}$ can be the input voltage of the PFC and $V_{out}$ can be the output voltage. FIG. 1 depicts a waveform diagram 100 illustrating the concept of average current control CCM as exemplified by waveforms 102, 104, and 106, and a ramp signal 108 and a control signal 110. The waveforms shown in the waveform diagram 100 of FIG. 1 demonstrate that when the duty cycle becomes smaller than an equilibrium value, the duration of the secondary stroke can also become smaller. This can offer less reduction for the inductor current and therefore an increase in the current as compared to the current at the start of the switching cycle (e.g., see waveform 102 in FIG. 1). This can be demonstrated by "duty_off<equilibrium→Iav rises" as shown in FIG. 1, wherein "Iav" can refer to an average inductor current and "duty_off" can refer to a duty cycle.

When the duty cycle is higher than the equilibrium, an increase in the reduction of the inductor current can occur, and therefore a corresponding decrease in the current can result, as compared to the current at the start of the switching cycle (e.g., see waveform 106 in FIG. 1). This can be demonstrated by "duty_off>equilibrium→Iav falls" as shown in FIG. 1, wherein "Iav" can refer to an average inductor current and "duty_off" can refer to a duty cycle.

The duty cycle may be generated by a ramp signal 108 (i.e. a "ramp" for PWM (Pulse Width Modulation)) and a control signal 110, where the ramp signal 108 and the control signal 110 can be then subjected to a comparison operation by a comparator that generates the duty cycle signal.

This means that an equilibrium may occur when the control signal 110 is proportional to $V_{in}/V_{out}$, wherein $V_{in}$ represents an input voltage and $V_{out}$ represents an output voltage. As the output voltage $V_{out}$ can be normally regulated to a fixed value, the result can be that the control signal may be proportional to the input voltage $V_{in}$. By making the control signal 110 proportional to the sensed current, the system can generate an input current that may be proportional to the momentary mains voltage ($V_{mains}(t)$), which can fulfill a power factor requirement.

FIG. 2 depicts a schematic diagram of a PFC circuit 130 that can apply the average current control principle. The circuit 130 shown in FIG. 2 includes a pair of diodes 132, 134 and another pair of diodes 136, 138. The diodes 134 and 138 can connect to ground 140. An inductor 144 can connect to diodes 132 and 138, and can also connect to ground 140 and the output of the diode 132 and the diode 136.

The circuit 130 can further include an oscillator 146 that connects to the negative input of an amplifier 148 that can output PWM waveforms that can be supplied to a transistor 150. The inductor 144 can also connect to the transistor 150 and to a diode 152. An output capacitor 154 can connect to the output of the diode 152 and to ground 141. The output capacitor 154 can be electronically located between a ground output ("Out Gnd") and the output of the diode 152.

The circuit 130 can further include a resistor 158 ("$R_{op}$") that is coupled to a shunt resistor 156 ("$R_{shunt}$"), ground 140 and the diode 138 and the diode 134. The shunt resistor 156 can be further connected to a resistor 160, which in turn can be coupled to a capacitor 164 and to a current amplifier 162. The capacitor 164 can be further coupled to a capacitor 166 and to a resistor 168. The capacitor 166 and the resistor 168 can also connect to the output of the current amplifier 162.

The capacitor 166 and the resistor 168 can be arranged in parallel with one another and can further connect to the positive input of the amplifier 148 and the output of the current amplifier 162. That is, the current amplifier output (i.e., output '$V_{ca}$') can connect to the positive input of the amplifier 148.

FIG. 3 depicts a schematic diagram of a control circuit 180 that can employ a multiplier approach. The control circuit 180 can include an voltage source 182 that can be offset by a diode 184. The voltage source 182 may be an AC voltage source and can supply an AC voltage '$V_{AC}$' to a resistor 186 ('$R_{IAC}$') and to an inductor 212. The resistor 186 can be coupled to a multiplier 188 that in turn can connect to a resistor 190 and the positive input of an amplifier 192 whose output can connect to a latch 194. The latch 194 can also be coupled to a gate driver logic component 200 that can connect to a transistor 219.

A resistor 198 can further connect to the transistor 214 and to ground 196. The transistor 214 can be further coupled to the inductor 212 and to a diode 216. A capacitor 218 can connect to the diode 216 and to the resistor 198 (and also to ground 196). The capacitor 218 can be also be arranged in parallel with a load 220. A resistor 210 can connect to the capacitor 218 and to the diode 216 and a resistor 208 and also to the negative input of an error amplifier 202 that outputs a voltage $V_{EA}$. The resistor 208 can also be coupled to ground 206. A reference voltage 204 ("$V_{REF}$") can connect to the positive input of the error amplifier 202. The output from the error amplifier 202 can also be coupled to the multiplier 188.

In control circuit 180, the control output $V_{EA}$ from the error amplifier 202 can set the power level in order to allow the PFC output voltage to be equal to the desired level while delivering power to the load 220. The multiplier 188 can then multiply the control output signal with the mains voltage shape to output a desired current level, which can be then compared with a sensed current level and can be further used to reset the latch 194 in order to define a primary current peak level. The switching cycle can be started by a 'Zcd' (zero current detection) signal in order maintain the system in a BCM.

For a system in BCM operation, the input current drawn from the mains can be proportional to the primary peak current and can also be proportional to the "on time" of the PFC switch. This arrangement can make it easy to render a good power factor. When the system goes to DCM, the average current may be lower for the same primary peak current, because of a ringing interval that may arise after the end of the secondary stroke where no current is drawn from the mains. Some devices may use a PFC circuit where this effect can be compensated by the additional adaption of the primary peak current based on the ratio: Tper/(Ton+Tsec).

FIG. 4 depicts a group of equations 230 that can be used to define factors for a PFC circuit. Providing for a high power factor means that the input current drawn by the PFC circuit can be proportional to the momentary mains voltage. Ideally, this situation can be represented by defining a factor K2 according to the equations 230 as shown in FIG. 4. That is:

$I\text{in}=k2 \cdot V\text{mains}$ $P\text{in}=V\text{mains} \cdot I\text{in}$ $P\text{in}=V\text{mains} \cdot (k2 \cdot V\text{mains})$ $P\text{in}=V\text{mains}^2 \cdot k2$ Thus, the momentary input current equals the momentary mains voltage times a factor k2. This means that the momentary input power can be proportional to the square of the momentary input voltage.

FIG. 5 depicts a graph 240 and a graph 250 demonstrating power factor data for a power factor corrector according to the equations 230 shown in FIG. 4. Graph 240 and curve 242 plot data indicative of Vmains(t) with respect to time 't' based on the equation Pin (t,K2):=Vmains(t)2·k2 wherein k2b:=0.002. Graph 250 depicts curves 252 and 254 respectively for Pin(t,k2b) and Pin (T,k2Aa) wherein k2a=1×10⁻³ and k2b=2×10⁻³. It should be appreciated that such values and parameters are illustrated and discussed herein for illustrative purposes only and are not limiting features of the disclosed embodiments.

FIG. 6 depicts a graph 260 depicting average power over a mains half cycle for a power factor corrector circuit. The curve 262 and the curve 264 shown in graph 260 demonstrate that for the average power over a mains half cycle, the average value of the power can be half of the peak value of the square of a sine wave:

$$\text{Pin\_av}(k2, V\text{mainspeak}) = \frac{V\text{mainspeak}^2}{2} \cdot k2$$

Thus, fixing the value 'k2' would mean that the power level is proportional to the square of the mains voltage amplitude. Accordingly, the gain of the closed loop can be proportional to the square of the mains voltage amplitude. In some cases, it may be desirable to have a fixed gain of the total control loop. A constant gain can prevent a 0 db loop gain frequency for closed loop shifts. In this manner, an optimum dynamic response may be possible for universal mains voltage while maintaining optimum stability for the loop.

K2 therefore can include a mains voltage that is compensated by 1/Vmains^2, which allows the gain from the control-to-output power to be compensated for the mains voltage amplitude.

In a practical PFC, it is not easy to define behavior according to this desired factor k2. Prior art DCM controllers, for example, often use on-time control with BCM or fixed frequency DCM. In BCM, the factor k2 may be more or less defined as a fixed-on-time factor, which can cause a peak current, 'Ipeak', to be proportional to the momentary mains voltage. Therefore in BCM, the input current can be proportional to "Ipeak/2' and may be also proportional to the mains voltage. In DCM with fixed frequency, the average current is no longer 'Ipeak/2' because of the changing ratio between the 'primary+secondary' stroke and the period time.

With conventional techniques and circuits such as discussed above, it may be possible to configure a CCM or a DCM power factor corrector. To date, CCM and DCM approaches have not been combined in a manner that allows a power factor corrector to operate for DCM and CCM within the main half cycle. In addition, the loop gain and dynamic behavior are different in CCM and DCM applications in power factor correctors, which makes it more complex to define a closed loop and obtain a dynamic performance. Another problem with power factor correctors relates to potential instabilities (e.g., short long cycles) that can occur in CCM for a duty cycle greater than 50%. In addition, the operating frequency in BCM leads to undesired large frequencies during part of the mains half cycle.

Accordingly, there is a long-felt need for AC/DC power converters in power management systems to address the foregoing problems.

SUMMARY

Embodiments of a method and a device are disclosed. In an embodiment, a circuit can include a power factor corrector, wherein at least two input variables are defined for the power factor corrector; and a processor that communicates with the power factor corrector, and which selects variables in the power factor corrector with respect to the at least two input variables defined for the power factor corrector, wherein the at least two input variables include a switching frequency and an input current and the variables include an amount of operation in a conduction mode and at least one of a primary peak current and a primary conduction interval, and wherein the variables in the power factor corrector are adapted to the at least two input variables to allow the power factor corrector to operate in an operating mode that includes the conduction mode.

In an embodiment of the circuit, the conduction mode can comprise at least one of: a DCM (Discontinuous-Conduction Mode) and a CCM (Continuous-Conduction Mode).

In an embodiment of the circuit, the primary peak current can be utilized as a variable external to a region near a mains zero-crossing.

In an embodiment of the circuit, a Ton (Timer On) control parameter can be utilized within a region near a mains zero-crossing.

In an embodiment of the circuit, at least a part of the Ton control parameter related to a positive inductor current can be scaled to the primary peak current by an adaptively determined factor.

In an embodiment of the circuit, the primary peak current can be utilized as a variable external to a region near a mains zero-crossing; and a Ton (Timer On) control parameter can be utilized within a region near the mains zero-crossing.

In an embodiment of the circuit, the power factor corrector circuit can include a boost converter.

In an embodiment of the circuit, the power factor corrector circuit can include a bridgeless power factor corrector circuit.

In another embodiment, a circuit can include a power factor corrector, wherein at least two input variables are defined for the power factor corrector; a processor that communicates with the power factor corrector, and which selects variables in the power factor corrector with respect to the at least two input variables defined for the power factor corrector, wherein the at least two input variables include a switching frequency and an input current and the variables include an amount of operation in a conduction mode and at least one of a primary peak current and a primary conduction interval; and a switching converter unit that communicates with the processor and which adapts the variables in the power factor corrector to the at least two input variables to allow the power factor corrector to operate in an operating mode that includes the conduction mode, said conduction mode including at least one of: a DCM (Discontinuous-Conduction Mode) and a CCM (Continuous-Conduction Mode).

In an embodiment of the circuit, the primary peak current can be utilized as a corresponding variable external to a region near a mains zero-crossing; and a Ton (Timer On) control parameter is utilized within a region near the mains zero-crossing.

In another embodiment, a method of operating a circuit, can involve defining at least two input variables for a power factor corrector; selecting variables in the power factor corrector with respect to the at least two input variables defined for the power factor corrector, wherein the at least two input variables include a switching frequency and an input current and the variables include an amount of operation in a conduction mode and at least one of a primary peak current and a primary conduction interval; and adapting the variables in the power factor corrector to the at least two input variables to allow the power factor corrector to operate in an operating mode that includes the conduction mode.

In an embodiment of the method, the conduction mode can comprise a DCM (Discontinuous-Conduction Mode).

In an embodiment of the method, the conduction mode can comprise a CCM (Continuous-Conduction Mode).

In an embodiment of the method, the conduction mode can comprise at least one of: a DCM (Discontinuous-Conduction Mode) and a CCM (Continuous-Conduction Mode).

An embodiment of the method can further involve utilizing the primary peak current as a corresponding variable external to a region near a mains zero-crossing.

An embodiment of the method can further involve utilizing a Ton (Timer On) control parameter within a region near a mains zero-crossing.

In an embodiment of the method, at least a part of the Ton control parameter related to a positive inductor current can be scaled to the primary peak current by an adaptively determined factor.

An embodiment of the method can further involve utilizing the primary peak current as a corresponding variable external to a region near a mains zero-crossing; and utilizing a Ton (Timer On) control parameter within a region near the mains zero-crossing.

In an embodiment of the method, the circuit can comprise a boost converter.

In an embodiment of the method, the circuit can comprise a bridgeless power factor corrector.

BRIEF DESCRIPTION OF THE DRAWINGS

FIGS. 12, 13, 14, 15, 16, 17, 18 and 19 depict equations for calculating DCM and CCM parameters for a power factor corrector.

Throughout the description, similar reference numbers may be used to identify similar elements.

DETAILED DESCRIPTION

Figure 1:
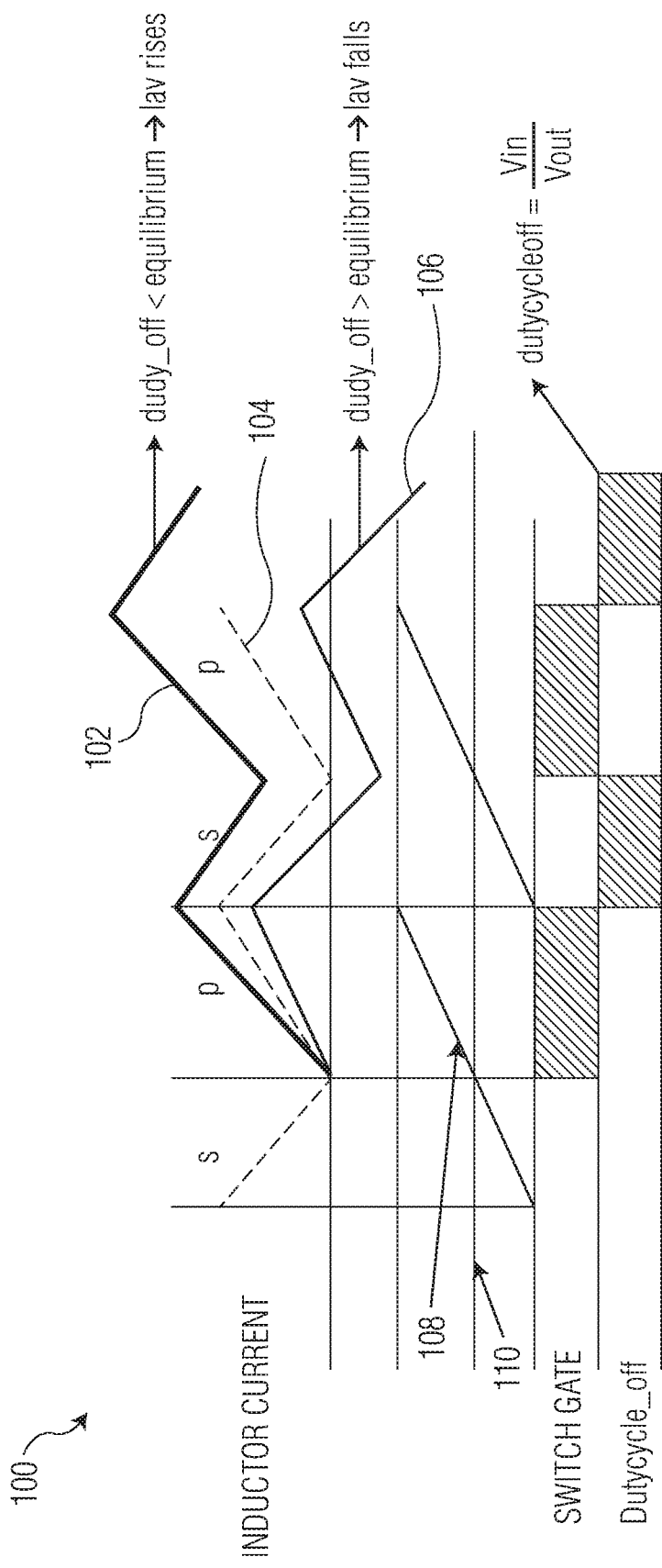
FIG. 1 depicts a waveform diagram illustrating the concept of average current control CCM.
Figure 2:
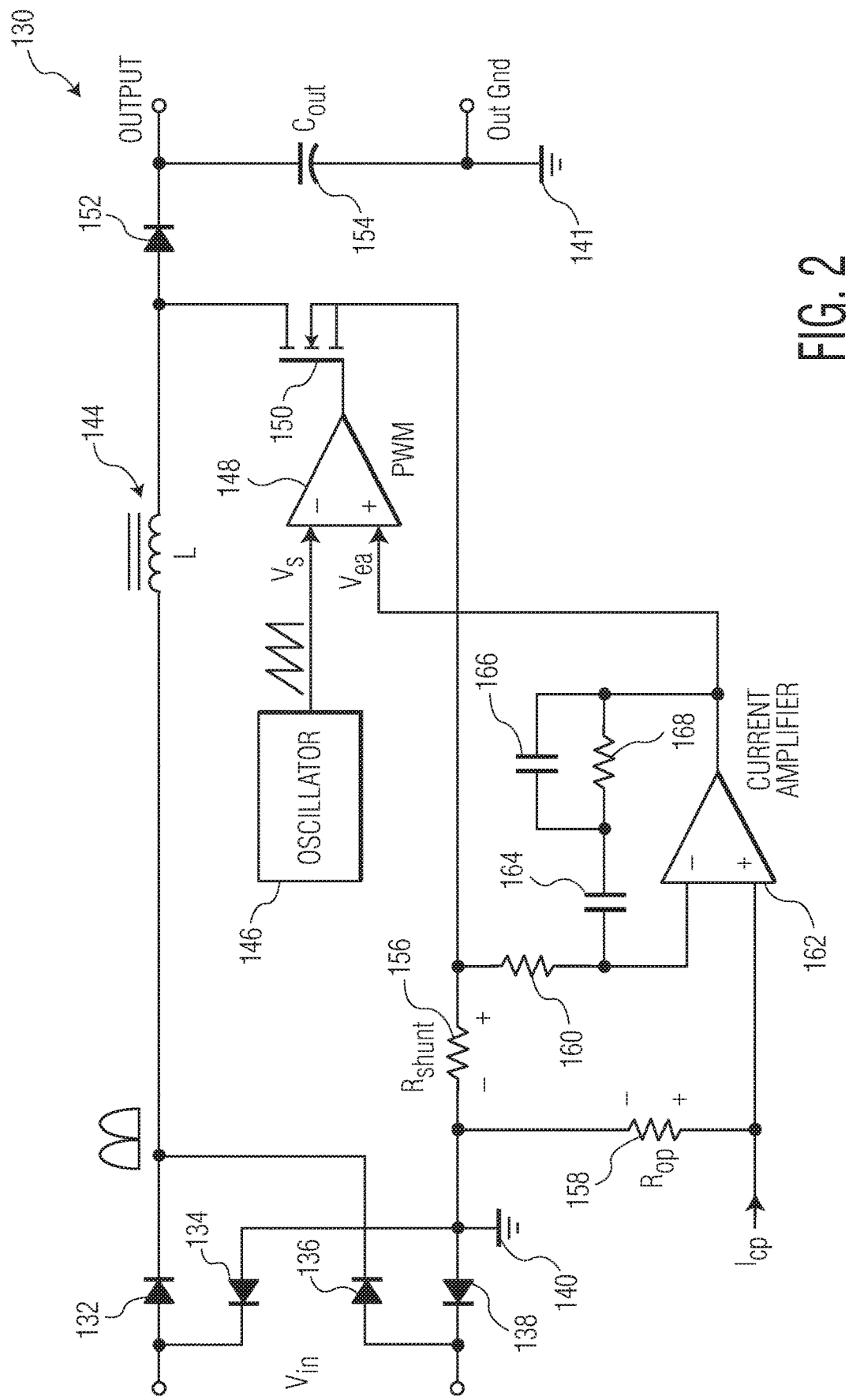
FIG. 2 depicts a circuit diagram of a power factor corrector that uses the average current control principle.
Figure 3:
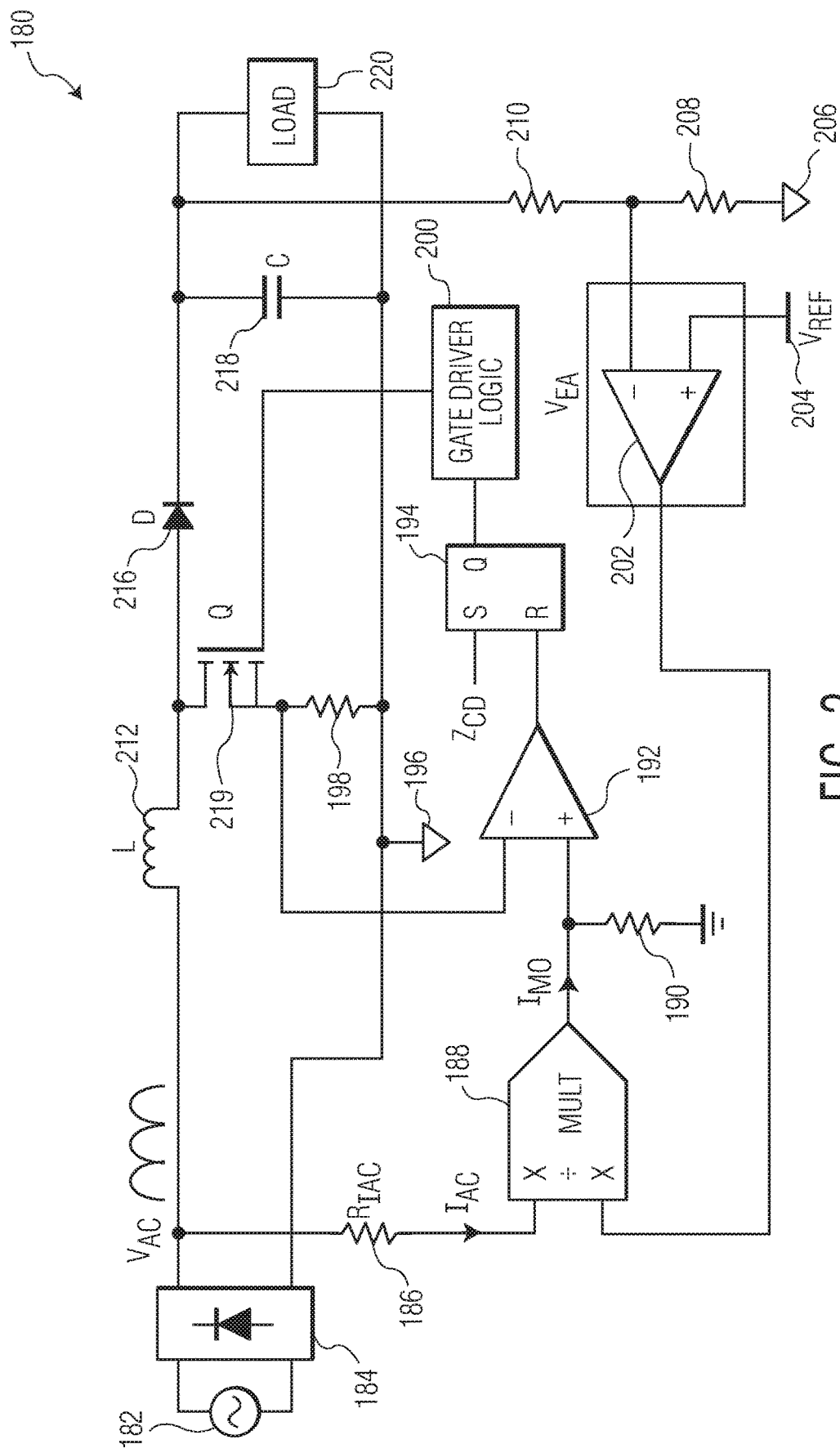
FIG. 3 depicts a schematic diagram of a conventional control circuit using a multiplier approach.
Figure 4:
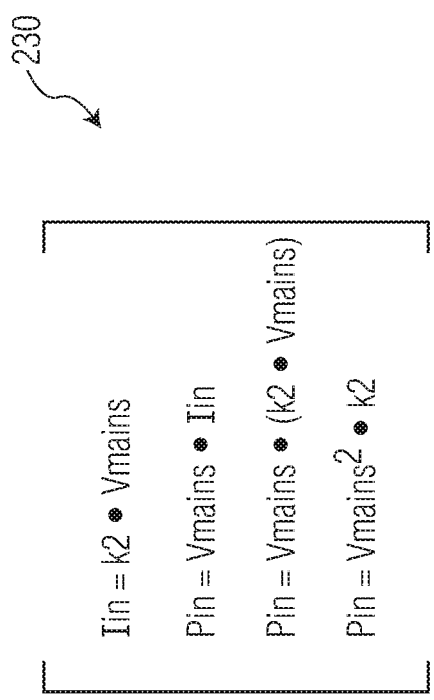
FIG. 4 depicts a group of equations that defines factors for a power factor corrector.
Figure 5:
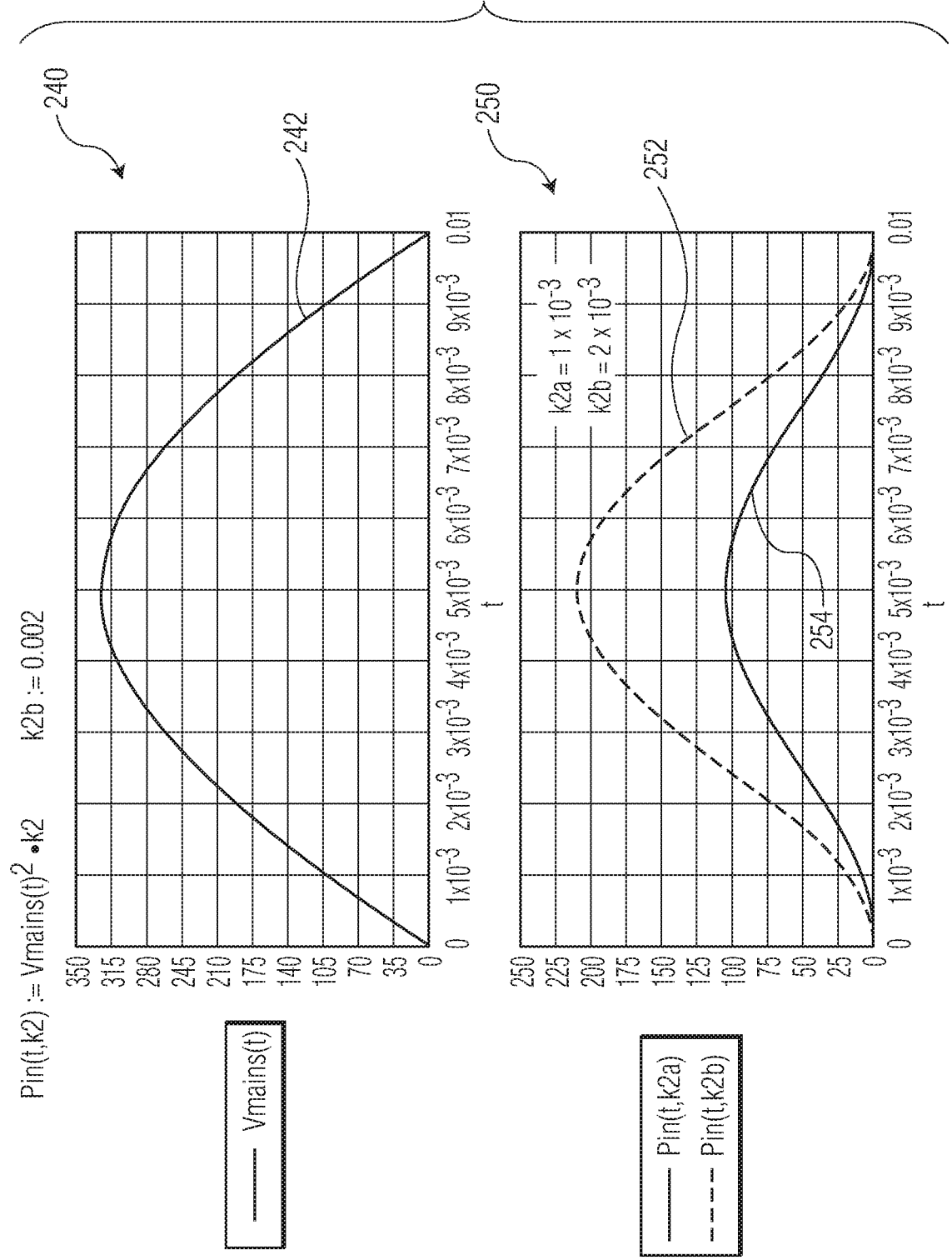
FIG. 5 depicts example graphs demonstrating power factor data for a power factor corrector.
Figure 6:
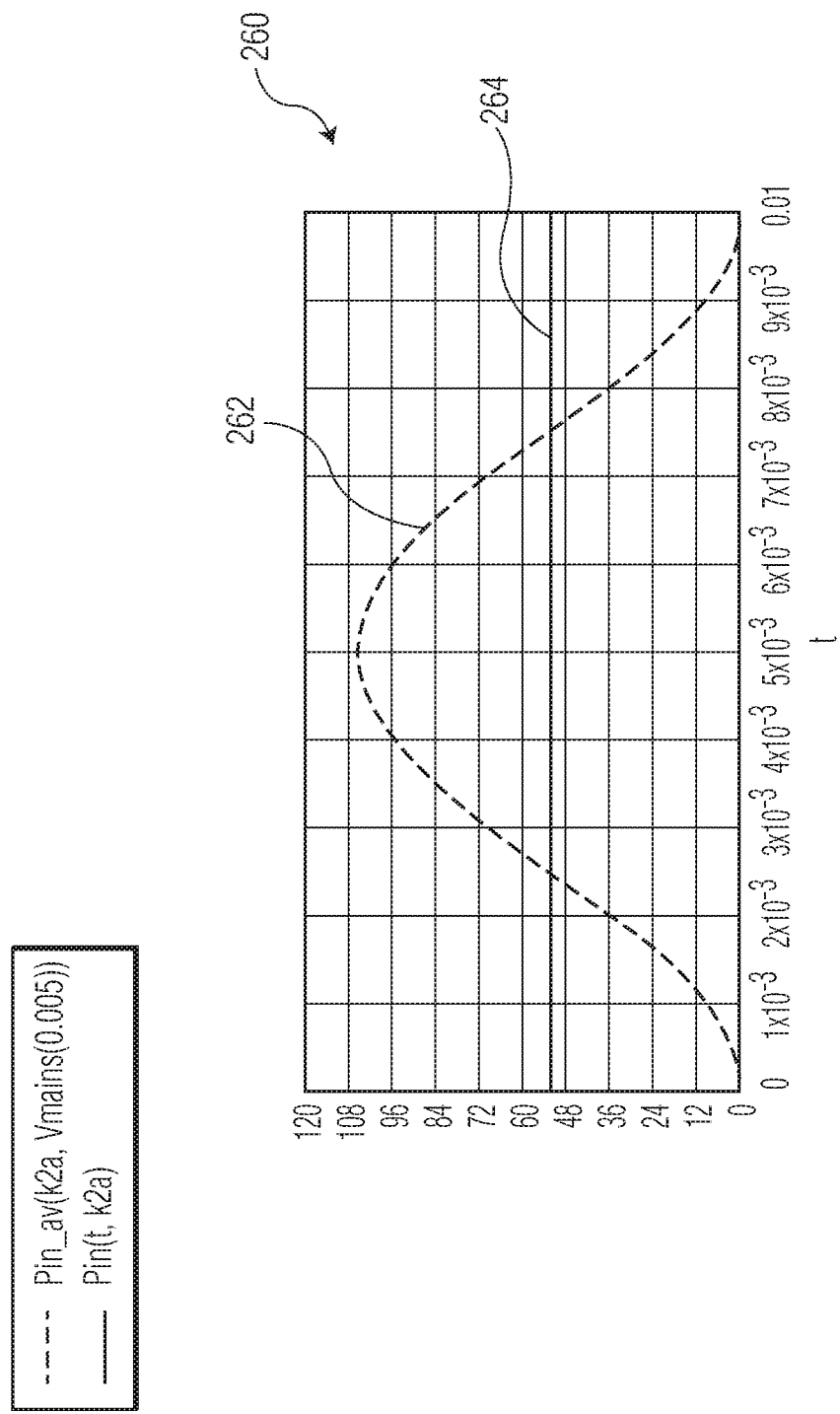
FIG. 6 depicts an example graph depicting average power over a mains half cycle for a power factor corrector.

It will be readily understood that the components of the embodiments as described herein and illustrated in the appended figures can be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims can be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Several aspects of the disclosed embodiments are presented with reference to various systems, methods and devices. These systems, methods and devices are described in the following detailed description and illustrated in the accompanying drawings by various blocks, modules, components, circuits, steps, operations, processes, algorithms, engines, applications, etc. (which can be individually or collectively referred to as "elements"). These elements may be implemented using electronic hardware, computer software, or any combination thereof. Whether such elements are implemented as hardware or software depends upon the particular application and design constraints imposed on the overall system.

The disclosed embodiments relate to a power factor corrector that can be configured to operate in DCM or CCM, wherein two or more desired input variables can be defined and an algorithm implemented, which can handle adapting corresponding variables in the power factor corrector to adapt to the desired input variables. In an embodiment, the two (or more) input variables are preferably the desired operating frequency and the desired input current and the two corresponding variables are preferably the operating frequency and the input current.

As will be discussed in greater detail herein, the disclosed power factor corrector can be configured to operate at least in part according to an algorithm that is based on an estimation of partial derivatives, which can solve a set of equations using the partial derivatives. Such an algorithm can further involve steps or operations for driving a switching converter unit using a first peak current 'Ipeakh', a ratio 'a', and a second peak current, 'Ipeakl', which can be determined according to Ipeakl=F(a,Ipeakh).

Additionally, a processing unit can receive error signals, including a first error signal being the difference between a desired switching frequency and a measured switching frequency, and a second error signal being the difference between a desired average input current and a measured average input current. The processing unit can then generate the first peak current 'Ipeakh', and the ratio 'a' based on the received error signals. An element can also be implemented, which can limit the operating mode to DCM by calculating the frequency for BCM (=CCM/DCM border) and can also limit the desired switching frequency accordingly. In addition, the power factor corrector can be arranged to include elements such as, for example, a boost converter, a bridgeless power factor corrector or an interleaved boost converter.

Figure 7:
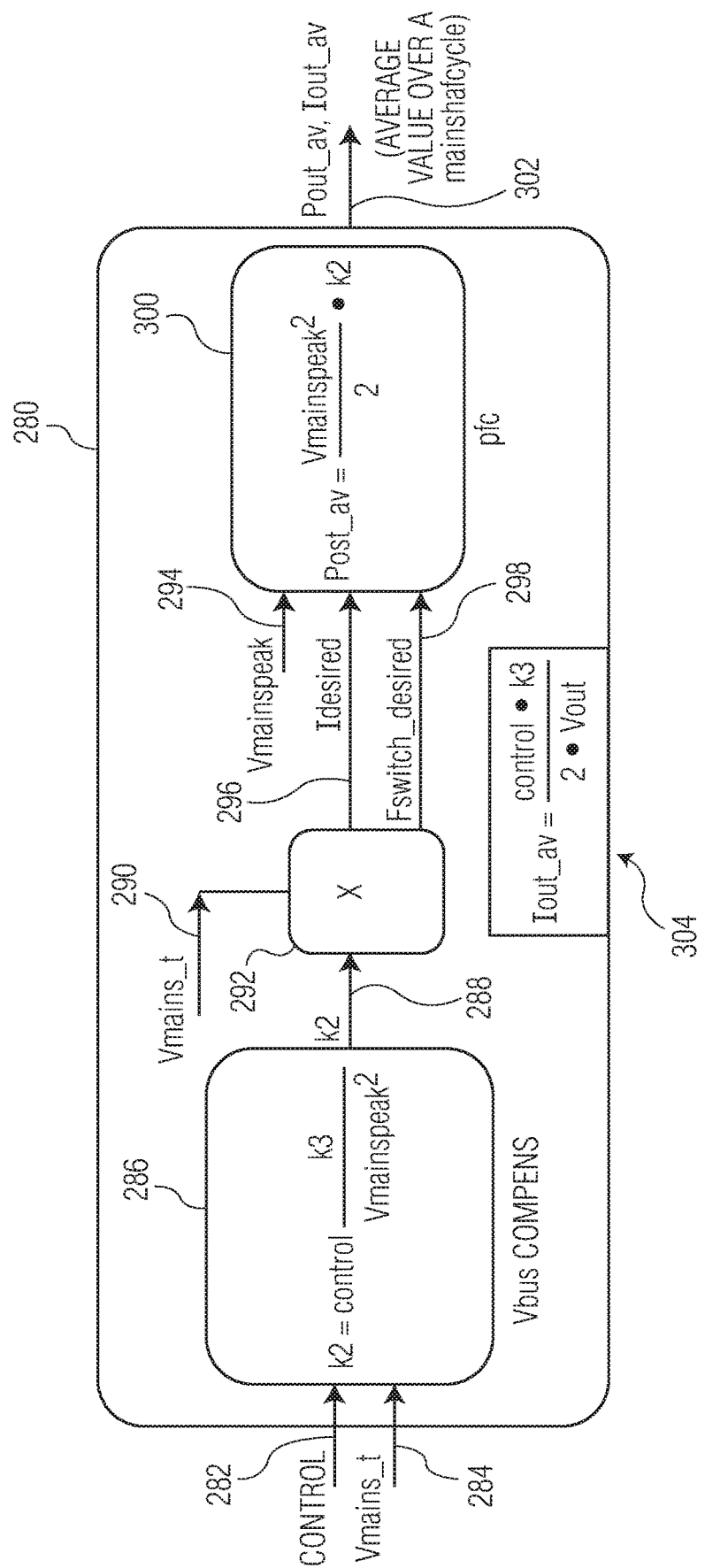
FIG. 7 depicts a block diagram of a power factor corrector in which the desired input current and the desired frequency can be met.

Accordingly, FIG. 7 illustrates a flow diagram depicting logical operations of a control method 300 for a power factor corrector in which the desired input current (e.g., the average current over a switching cycle) and the desired frequency can be met. In the embodiment depicted in FIG. 7, these two parameters can be set independently of one another. The desired input current can be then defined using, for example, a multiplier approach as discussed in greater detail herein.

As shown in FIG. 7, a control signal 282 can be input to a voltage compensation block 286, which can generate a control signal represented by the parameter "k2" for output by the voltage compensation block 286 to a multiplier "X". A momentary voltage 284 ('Vmains') can also be input together with the control signal 282 to the voltage compensation block 286. The operation indicated by the voltage compensation block 286 (i.e., the 'Vbus' compensation block) can involve voltage compensation, the result of which can include the output of the 'K2' signal 288. Note that the parameter 'k2' (also referred to as 'K2' in some instances) as utilized herein relates to the input control level.

The transfer from control to 'k2' can involve the mains voltage compensation operation depicted at block 286. The variable 'k2' can be then multiplied, as depicted at block 292, by the momentary 'Vmains' voltage 290 to obtain the shape of a desired input current ('Idesired') 296, for the PFC. This desired input current 'Idesired' can possess a proper shape for fulfilling the power factor requirement.

Note that the power factor corrector can also receive as input, a desired switch frequency ('Fswitch_desired'), as shown at arrow 298, and the mains peak voltage ('Vmainspeak2') as indicated by arrow 294. The resulting output 302 is the average value over a mains half cycle. The equation 304 shown in FIG. 7 can describe the average output current ('Iout_av').

Note that the terms mains, mains voltage, mains power, mains electricity, and so on as utilized herein can relate to a general-purpose AC electric power supply. This is a form of electrical power that can be delivered to, for example, homes and business, and can be in the form of electrical power that consumers use when plugging domestic appliances, televisions, and electric lamps and so on, into wall outlets. In the United Kingdom and Canada, the term "mains electricity" is typically used and the United States refers to terms such as grid power, wall power, and domestic power to refer to main, mains power, mains voltage or mains electricity.

Figure 8:
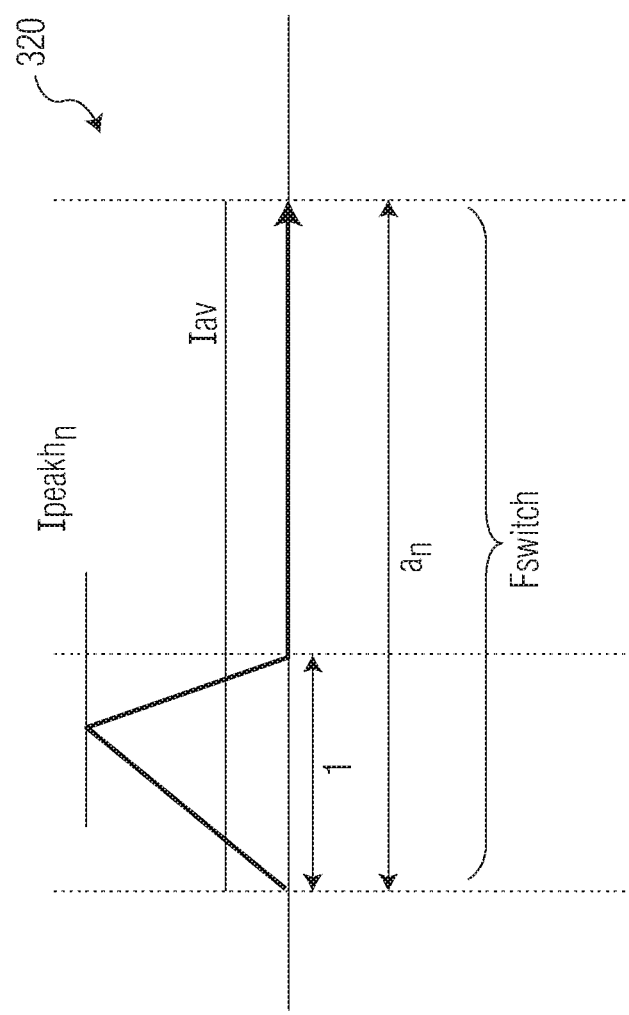
FIG. 8 depicts a waveform representative of the input current (neglecting parasitic ringing effects) of a power factor corrector operating in DCM.

FIG. 8 depicts a waveform 320 representative of the input current (neglecting parasitic ringing effects) of a power factor corrector operating in DCM. After attaining the desired current 'Ipeakh' during the primary stroke, the current can fall back to zero at the end of the secondary stroke. Note that in the waveform 320 shown in FIG. 8, the duration of the 'primary+secondary' stroke can be scaled to a value of 1. Then, a factor 'a' can be defined as a ratio between the 'primary+secondary' stroke and the total period time (=1/Fswitch).

A frequency 'Fbcm' (i.e. a BCM frequency) can be defined as the frequency that would occur if at the given 'Ipeakh', the system would be forced to operate in BCM (boundary conduction mode). For a=1, a BCM operation occurs. Now, the frequency for given a will be as shown in Equation 1 below:

$$Fswitch = \frac{Fbcm}{a} \quad (1)$$

While the average current over a switching cycle equals:

$$Iav\_in = \frac{Ipeakh}{2 \cdot a} \quad (2)$$

Figure 9:
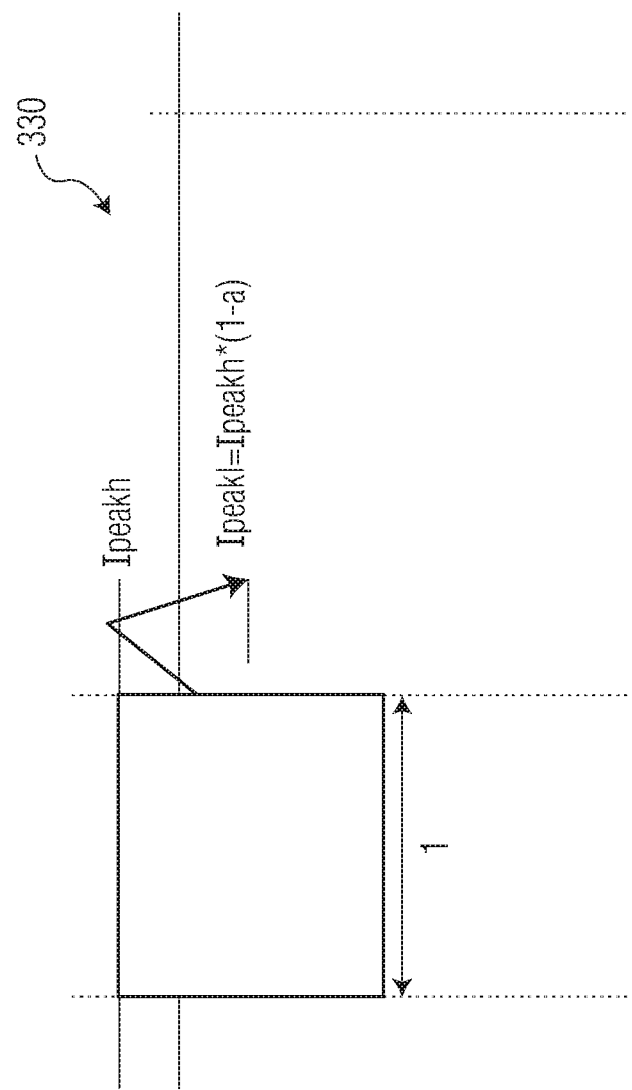
FIG. 9 depicts an example waveform for a power factor corrector in which the same equation for the switching frequency is capable of being used for DCM and CCM operations.

Based on the equation for the switching frequency 'Fswitch', this concept can be extended for a CCM operation, as shown in FIG. 9, which depicts an example waveform 330 for a power factor corrector in which the same equation for switching frequency can be used for DCM and CCM operations. Taking the proposed relation between 'Ipeakh', 'Ipeakl' and 'a', the same equation for the switching frequency can be used for DCM and CCM operation. For example if a=0.5, Ipeakl=Ipeakh(0.5) may be needed, which can result in Fswitch=Fbcm/0.5. For a<1 this, following equations can result in CCM:

$$Ipeakl = Ipeakh \cdot (1-a) \quad (3)$$

$$Iavccm = Ipeakh \cdot \left(1 - \frac{a}{2}\right) \quad (4)$$

$$Fswitch = \frac{Fbcm}{a} \quad (5)$$

Figure 10:
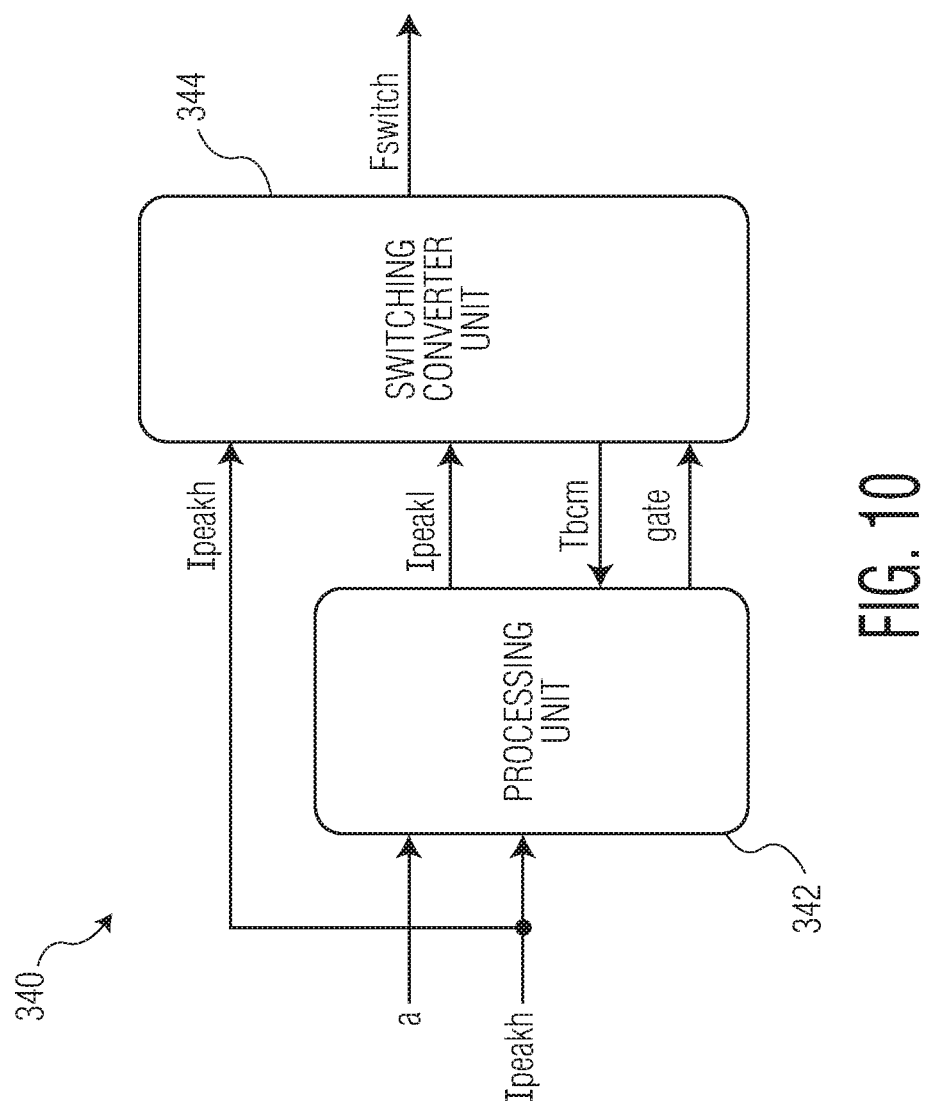
FIG. 10 depicts a block diagram of a system that includes a processor and a power factor corrector.

FIG. 10 depicts a block diagram of a system 340 that includes a processor 342 and a power factor corrector 344. The system 240 shown in FIG. 10 illustrates control functions where signals 'a' and 'Ipeakh' can be input to the processor 342 (which is also shown as a 'processing' block in FIG. 10). The signal 'Ipeakh' can be input to the power factor corrector 344. A control signal 'Ipeakl" can be output from the processor 342 and input to the power factor corrector 344. The control signals 'a' and 'Ipeakh' and "Ipeakl" can be implemented based on Ipeakl=F(a,Ipeakh) (according to Equation (3) above for CCM or 0 for DCM).

The processor 342 can additionally generate a gate signal for controlling the power factor corrector 344. Such a gate signal can be output from the processor 342 and input to the power factor corrector 344 as shown in FIG. 10. This same gate signal can also be used for controlling and timing operations of the power factor corrector 344 and for current sensing and for comparing a sensed inductor current with the 'Ipeakh' and 'Ipeakl' levels. Based on the timing information of the primary and secondary stroke, the power factor corrector 344 can also send a signal 'Tbcm' from the power factor corrector 344 to the processor 342 that indicates the duration of the actual 'primary+secondary' stroke.

Based on the 'Ipeakl' and 'Ipeakh' value, the power factor corrector 344 circuit can control the primary and secondary stroke duration of a CCM operation. During an DCM operation, 'Ipeakl' can be zero. In this case, the processor 342 can use the signal 'Tbcm' and the signal 'a' to define the duration of the total switching cycle. Based on the value of 'a' and 'Tbcm', the processor 342 can define the duration of the wait interval after the end of the secondary stroke, and before the next primary stroke is allowed to start according to, for example, the waveform 320 shown in FIG. 8.

Figure 11:
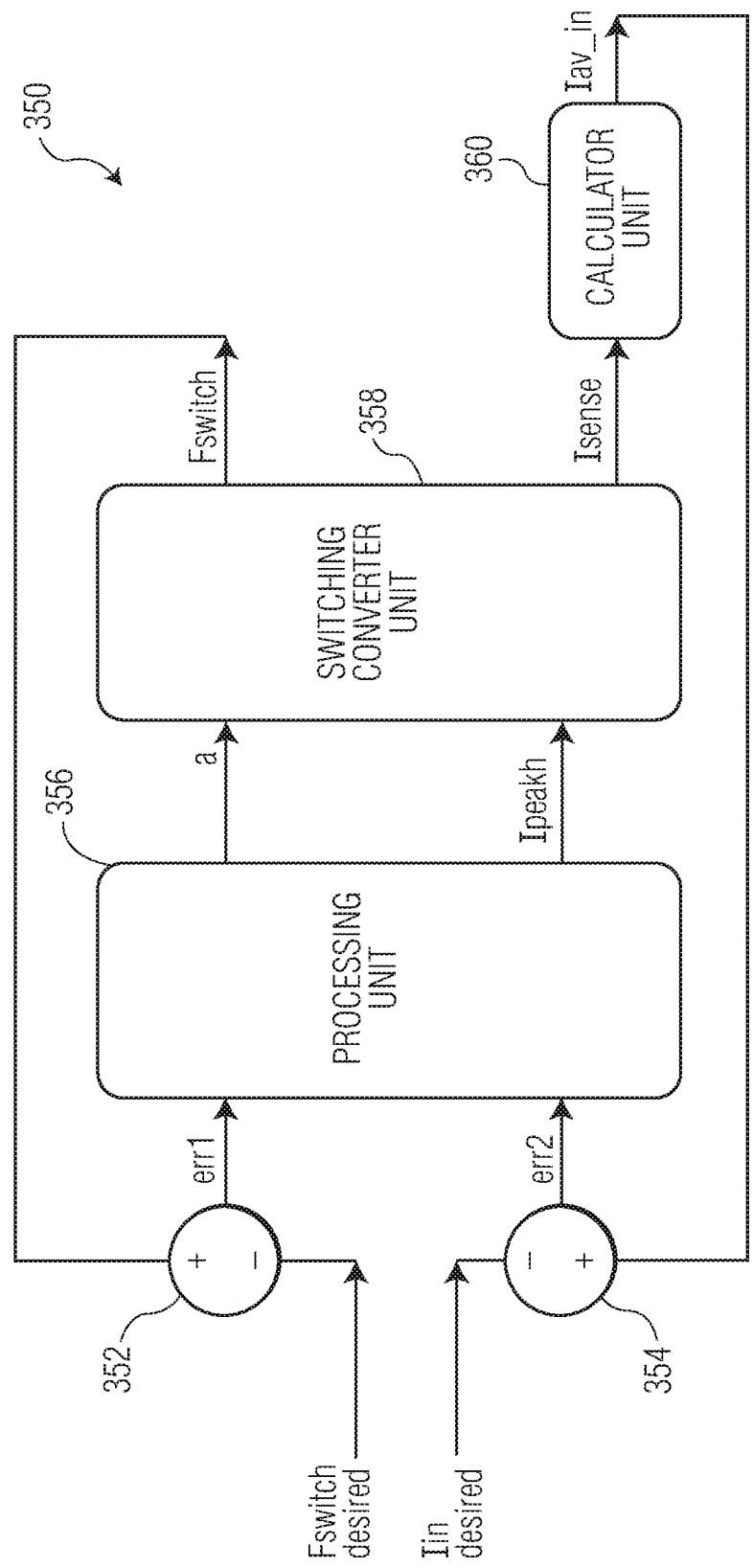
FIG. 11 depicts a block diagram of a system for setting the proper parameters for attaining a desired switching frequency and input current level for a power factor corrector.

FIG. 11 depicts a block diagram of a system 350 for setting proper parameters for attaining a desired switching frequency and input current level for a power factor corrector. That is, another aspect of the disclosed embodiments involves a function that sets the proper value of 'a' and Ipeakh and Ipeakl=F(a,Ipeakh) in order to attain a desired switching frequency ('Fswitch' desired) and input current level ('Iin' desired).

FIG. 11 thus illustrates an embodiment in which the system 350 includes a processing unit 356, a switching converter 358, a calculator unit 360 for calculating the average current over a switching cycle, a subtraction unit 352 for comparing the desired switching frequency with the actual switching frequency and a subtraction unit 354 for comparing the desired input current with the actual input current. In some example embodiments, the processing unit may be implemented as a processor different from that of processor 342 shown in FIG. 10. In other embodiments, the processing unit 356 and the processor 342 can be implemented as part of the same processing device.

In any event, the processing unit 356 can process simplified calculation models of the switching converter for Iav_in=F(a,Ipeakh) and Fswitch=f(a,Ipeakh).

At a certain moment, the switching converter 358 can operate at a value a=a1 and Ipeakh=Ipeakh1. Based on this value, the resulting switching frequency 'Fswitch' and the average input current over a switching cycle 'Iav_in' can follow and can be measured. The switching frequency 'Fswitch' can be measured directly, for example, by checking the gate signal of a power factor corrector switch. The value of the average input current 'Iav_in' can be calculated by the calculator unit 360 based on the sensed primary current over time.

The switching converter 358 can be driven using a first peak current ('Ipeakh'), a ratio 'a' and a second peak current: (Ipeakl)=F(a,Ipeakh). The processing unit 356 can receive two error signals, wherein the first error signal can constitute the difference between a desired switching frequency and a measured switching frequency, and the second error signal can comprises the difference between a desired average input current and a measured average input current. The processing unit 356 can generate the first peak current ('Ipeakh') and ratio 'a' based on the received error signals.

FIGS. 12, 13, 14, 15, 16, 17, 18 and 19 depict various equations for calculating DCM and CCM parameters for a power factor corrector. Based on the calculation models, and an operating point at Iin and Fswitch, new values for 'a' and Ipeak can be calculated if the partial effect of changing 'a' or Ipeakh (while also changing Ipeakl according to Ipeakl=F(a,Ipeakh)) is known.

The total effect on the average input current 'Iav_in' and the switching frequency 'Fswitch' can be the sum of the partial effects by changing 'a' or 'Ipeak' and can be described by partial derivatives as indicated by the equations 380 shown in FIG. 12. It may be necessary in some cases, to change 'a' and 'Ipeak' to move the average input current 'Iav_in' and the switching frequency 'Fswitch' over the desired distance towards the desired level. This means that 'da' and 'dIpeakh' from the equations 380 shown in FIG. 12 can be solved.

Writing the equations based on the block diagram of system 350 shown in FIG. 11, we can obtain the equations 382 shown in FIG. 13 or written in a matrix form as indicated by the equation 384 in FIG. 14.

A set of equations can be solved in a structural manner, as shown in equation 386 in FIG. 15 and equation 388 in FIG. 16. That is, equation 386 in FIG. 16 can solve for the value 'da' and the equation 388 can solve the value 'dIpeak'. In FIG. 17, the equation 390 can be the determinant of the system matrix. By replacing the first or second column of the system matrix by the following vector can result, as follows:

$$\begin{pmatrix} Iav\_in - Iin\_desired \\ Fswitch - Fswitch\_desired \end{pmatrix},$$

Figure 19:
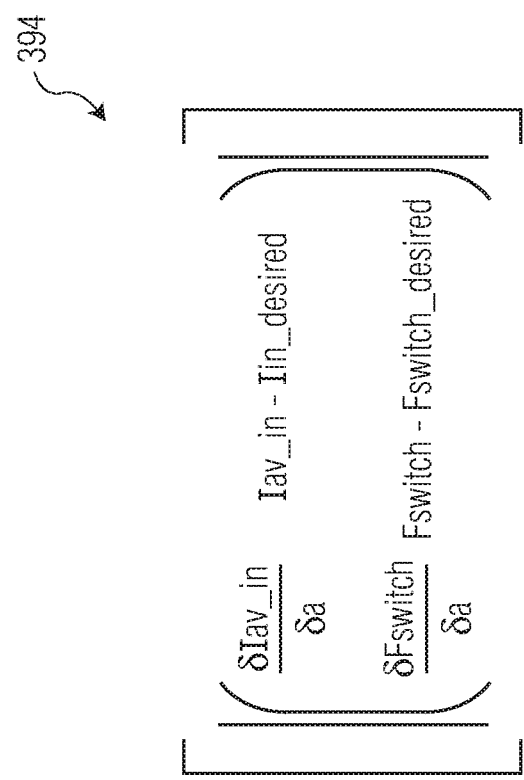

Two other determinants 392 and 394 can be then obtained as shown respectively in FIGS. 18 and 19. These determinants can be used as nominators for calculating 'da' (i.e., see equation 386 in FIG. 15) and 'dIpeak' (i.e., see equation 388 in FIG. 16) together with the denominator (i.e., see FIG. 17).

Based on this calculation, which can be a structured approach for solving a set of linear equations as part of the processing unit 356 of FIG. 11, a new value for the next switching cycle can be calculated for both 'a' and 'Ipeakh' in order to ensure that the switching frequency 'Fswitch' and the average input current 'Iav_in' are equal to the desired values.

When the following four partial derivatives as follows $$\frac{\delta Iav\_in}{\delta a} \frac{\delta Iav\_in}{\delta Ipeak} \frac{\delta Fswitch}{\delta a} \text{ and } \frac{\delta Fswitch}{\delta Ipeak}$$

are calculated correctly, the system can converge within one switching cycle to the desired operating point at the desired values of the switching frequency 'Fswitch' and the average input current 'Iav_in'.

According to an embodiment, the partial derivatives can be calculated based on equations of the switching converter 358 in combination with sensing of the required values of variables in the equations.

For a boost converter with an input voltage 'Vin', an output voltage 'Vout', a main inductance 'Lind', a primary peak current level 'Ipeakh', the BCM switching frequency 'Fbcm' can be approximated as shown in Equation (6):

$$Fbcm = \frac{Vin \cdot (Vout - Vin)}{Ipeakh \cdot Lind \cdot Vout} \tag{6}$$

Using the concepts discussed herein with respect to FIGS. 8 and 9, the switching frequency 'Fswitch' can be obtained as shown in Equation (7):

$$Fswitch = \frac{Fbcm}{a} = \frac{Vin \cdot (Vout - Vin)}{a \cdot Ipeakh \cdot Lind \cdot Vout} \tag{7}$$

The partial derivatives can be then easily calculated as shown in Equations (8) and (9) below:

$$\frac{\delta Fswitch}{\delta a} = \frac{Vin \cdot (Vin - Vout)}{Ip \cdot Lind \cdot Vout \cdot a^2} \tag{8}$$

and $$\frac{\delta Fswitch}{\delta Ipeak} = \frac{Vin \cdot (Vin - Vout)}{Ip^2 \cdot Lind \cdot Vout \cdot a}. \tag{9}$$

For the average input current, different equations may occur, depending on whether the system operates in DCM or CCM. In DCM, for example, the average input current over a switching cycle can be calculated as shown in Equation (10):

$$Iav\_in = \frac{Ipeakh}{2 \cdot a} \tag{10}$$

In CCM the average input current over a switching cycle can be calculated as shown in Equation (11):

$$\text{Iav\_in} = \frac{Ipeak \cdot (2 - a)}{2} \quad (11)$$

For a BCM operation, with a=1 both equations can generate the same result:

$$IavBCM = \frac{Ipeak}{2} \quad (12)$$

The partial derivatives for both DCM and CCM can be then calculated as shown in Equations 13, 14, 15, and 16 as follows:
DCM:

$$\frac{\delta \text{Iav\_in}}{\delta a} = -\frac{Ip}{2 \cdot a^2} \quad (13)$$

$$\frac{\delta \text{Iav\_in}}{\delta Ipeak} = \frac{1}{2a} \quad (14)$$

CCM:

$$\frac{\delta \text{Iav\_in}}{\delta a} = -\frac{Ip}{2} \quad (15)$$

$$\frac{\delta \text{Iav\_in}}{\delta Ipeak} = \frac{2 - a}{2} \quad (16)$$

According to Equation 8 and Equation 9, the calculation of partial derivatives may require that 'Vin', 'Vout' and 'Lind' are known. The input voltage 'Vin' and the output voltage 'Vout' can be measured directly or indirectly and the main inductance 'Lind' can be assumed as a fixed value known from the design, and therefore programmed as a constant.

Figure 20:
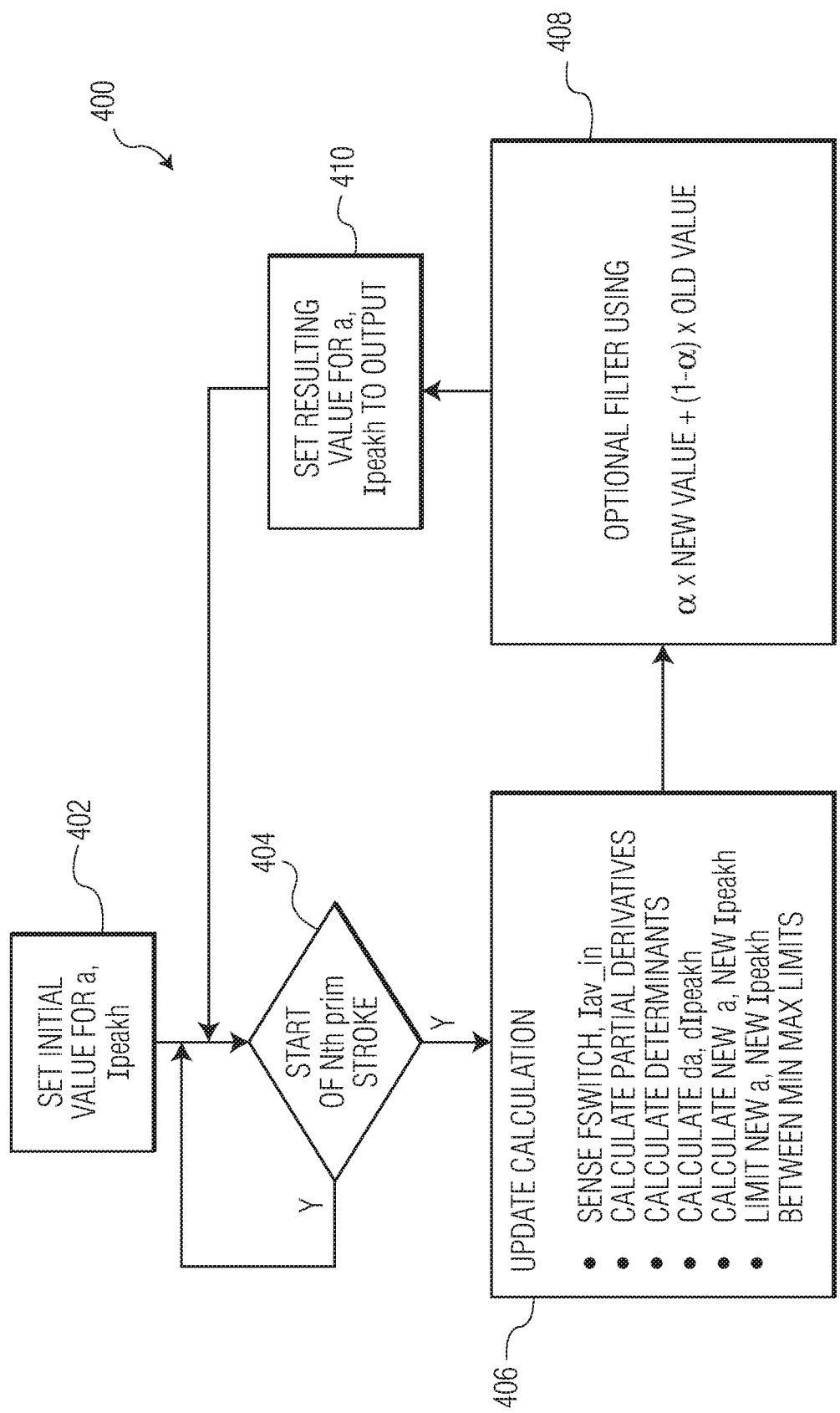
FIG. 20 depicts a flow diagram of a method for determining values for every N switching cycle wherein N is an integer number greater than or equal to 1.

FIG. 20 depicts a flow diagram of a method 400 for determining a required 'Ipeakh' and 'a' values for every 'N' switching cycle wherein 'N' can be an integer number that is >=1. As indicated at block 402, a step or operation can be implemented in which the initial value is set for 'a' and 'ipeakh'. Next, as shown at decision block 404 and block 406, at the start of every 'Nth' switching cycle (N can be set to integer value of at least 1) the calculation procedure can be accomplished according to the equations as previously discussed. The operations for this procedure are outlined as shown in block 406.

Optionally, following processing of the operation shown at block 406, the calculated vales of 'a' and 'Ipeakh' can be filtered, for example, as shown at block 408, by a filter that processes a part of the old value and a part of the new value. The resulting value can be then set for 'a' and 'ipeakh' to the output, as depicted at block 410. The operations shown at decision block 404, block 406, and so on can be then repeated.

Thus, the method 400 allows for the updated calculation to be available shortly after the start of a primary stroke. If a primary stroke is very short, the calculation may not be fast enough or more parallel processing may be needed, particularly given more circuit area.

Figure 21:
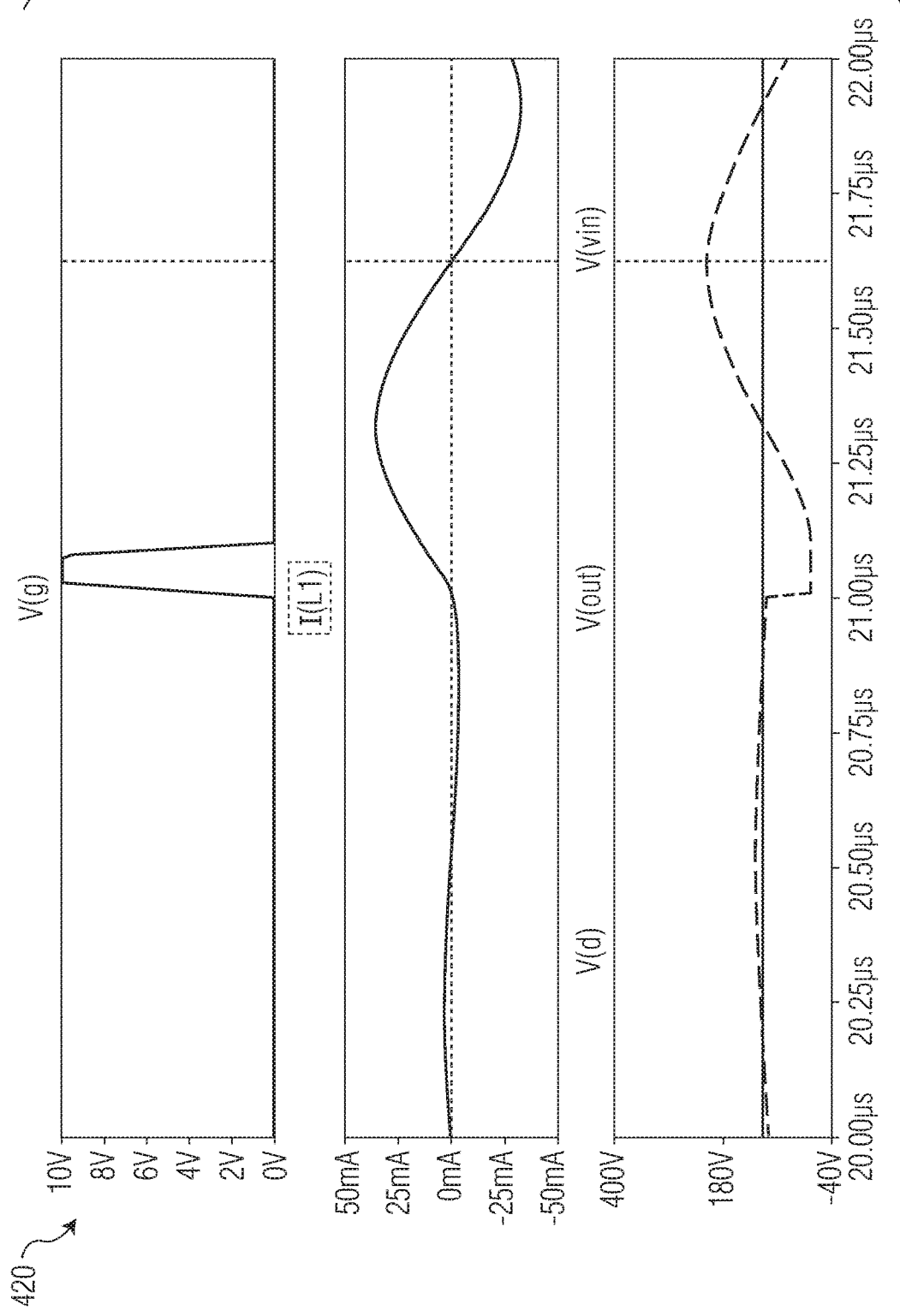
FIG. 21 depicts a graph of voltage and current data versus time (μs) for an example PFC circuit.

FIG. 21 depicts a graph of voltage and current data versus time (µs) for an example power factor corrector. In some embodiments, the aforementioned calculation procedure can be implemented based on the end of the primary stroke or the start of the secondary stroke. This approach can offer an advantage wherein the secondary stroke can possess a minimum duration, even if the duration of the primary stroke may be zero or almost zero (e.g., see graph 420 in FIG. 21). This situation can occur because during the primary stroke of the power factor corrector switch may be turned on (V(g)), thereby discharging the drain voltage (V(d)). As there can be a parasitic capacitance at the drain node, at least some time to charge the drain node to the level of Vin may be needed, while during this interval current can build up in the PFC inductance (I(La)). This means that the secondary stroke duration can occur during at least the ringing period, which can allow for more time for the algorithm to calculate the new 'a' and 'Ipeak' values.

Figure 22:
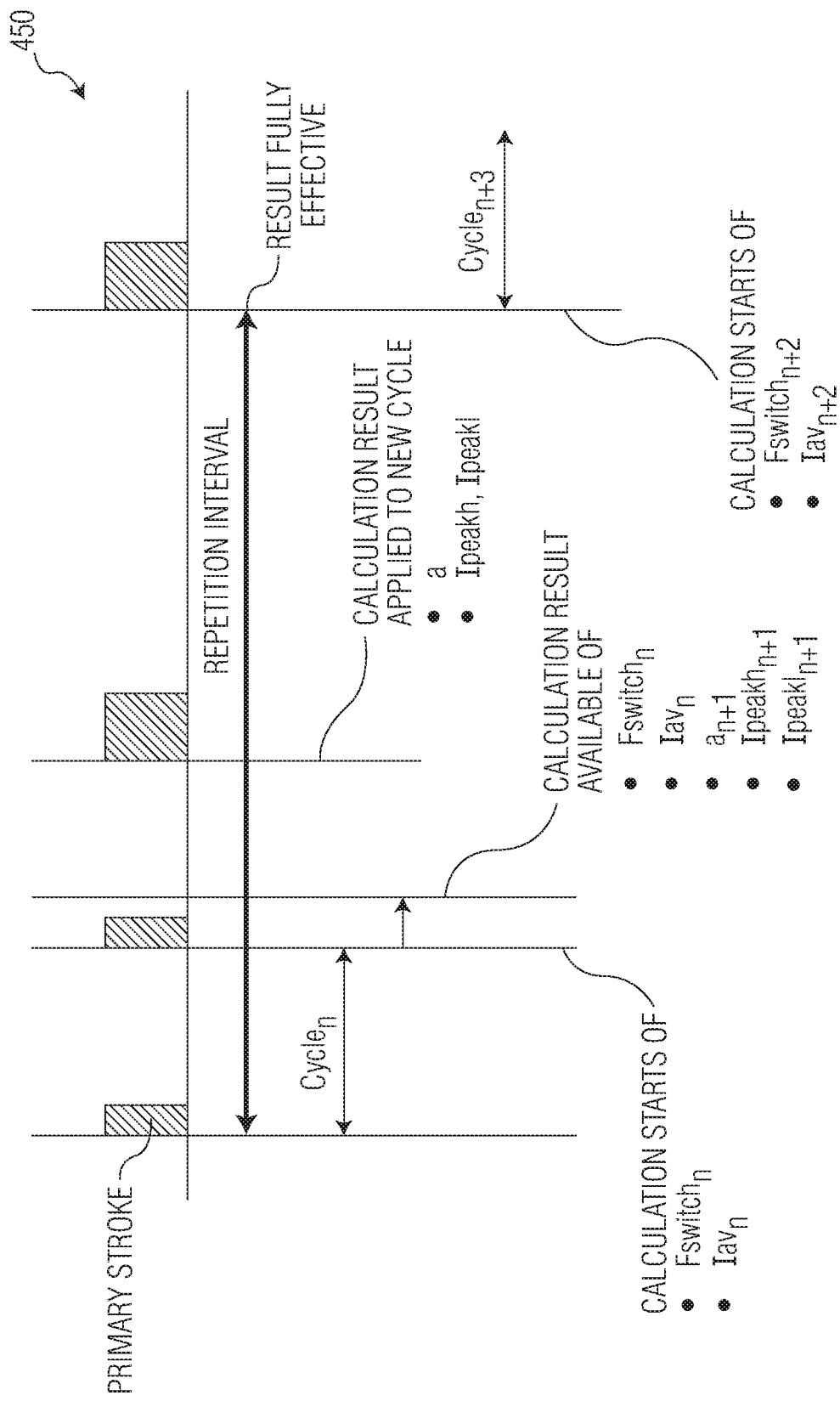
FIG. 22 depicts a schematic diagram of a calculation based on the detected average current and frequency of cycle with the result of cycle n applied to cycle n+2 with respect to a primary stroke and a repetition interval.

FIG. 22 depicts a schematic diagram 450 of a calculation based on the detected average current and frequency of cycle with the result of cycle 'n' applied to cycle 'n+2' with respect to a primary stroke and a repetition interval. Assuming that the input voltage, the output voltage, the desired input current and the desired frequency may not change after the beginning of cycle 'n' and a steady state situation at the beginning of cycle 'n+2', because the proper value of 'a' and Ipeak was calculated based on the desired situation.

At the end of cycle 'n+2', the actual frequency and average current can be available based on this new setting initiated at cycle 'n' and a new calculation can be made. This means that the minimum repetition interval for updating 'a' and 'Ipeak' can be every 3 cycles. One advantage of this embodiment is that it may allow for a much slower calculation, which can in turn save IC (Integrated Circuit) chip area, because the resulting calculation may need to be present at the end of cycle 'n+1'.

A disadvantage of this approach may be that there can be a delay of three switching cycles between a change in one of the determining variables (e.g., Vin, Vout, Fswitch_desired, Iin_desired) and the resulting operating point of the power factor corrector meeting this desired settings. In practice this means a phase shift between the input current of the PFC and the input voltage. As the effect is known, it can be compensated partly.

Figure 23:
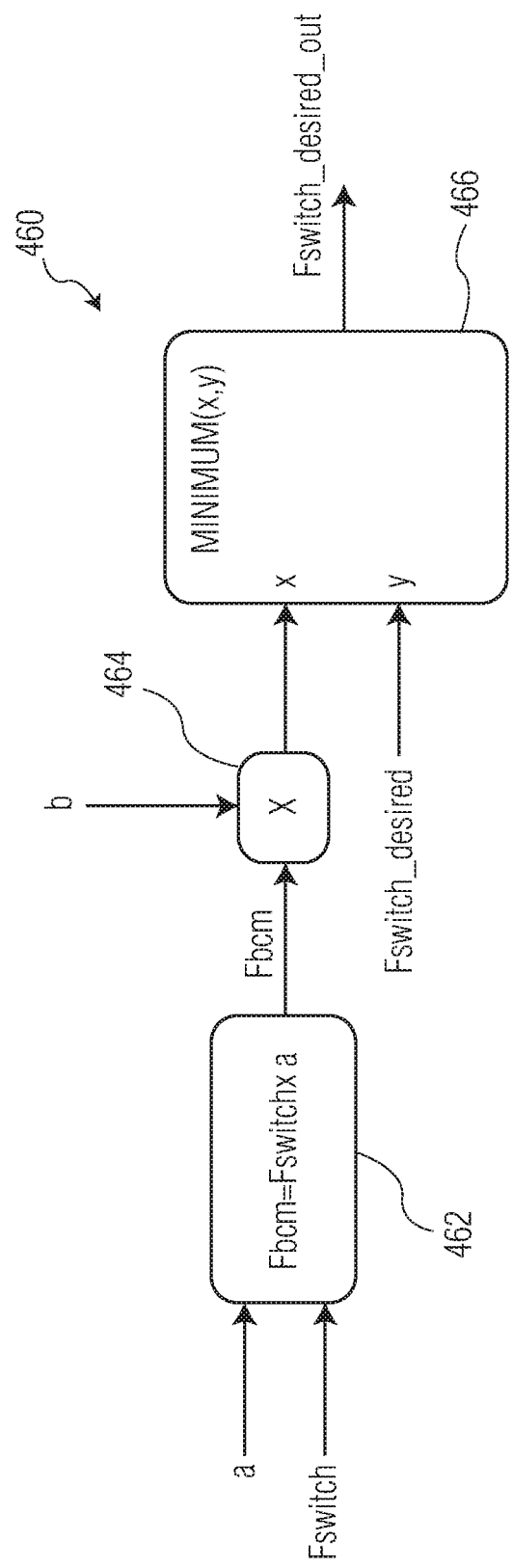
FIG. 23 depicts a block diagram of a system 460 for maintaining a DCM operation for a PFC.

FIG. 23 depicts a block diagram of a system 460 for maintaining a DCM operation for a PFC. Note that in some embodiments, CCM prevention can be applied in combination the earlier described features. The CCM prevention can be based on calculating the BCM operating frequency from the actual frequency and the actual value of 'a' according to Equation (16) below:

$$F\text{bcm} = F\text{switch} \cdot a \quad (16)$$

The system 460 illustrated in FIG. 23 can be implemented to maintain a PFC in DCM. A shown at block 462, an operation for calculating 'Fbcm' can be implemented. The factor 'a' can be the output of the processing unit 356 of FIG. 11 and can be fed as an input to block 462 shown in FIG. 23 in combination with the actual measured switching frequency ('Fswitch'), which can result in a calculated value of 'Ran'. The value 'Fbcm' can be then multiplied as indicated at block 464 by a factor 'b' that can be slightly smaller than 1, for example, 0.95. A factor such as 0.95 can allow the overall power factor corrector system or power factor corrector circuit to operate in DCM at a frequency slightly lower than the BCM frequency, which can allow the system to use valley switching.

The calculated value can be then offered to the x input to a "minimum" operation as shown at block 466, which receives the minimum value of the a and y input. The result is that the desired switching frequency output 'Fswitch_desired_out' of the operation shown at block 466 can equal the desired switching frequency 'Fswitch_desired' (e.g., see FIG. 11) as long as the system operates in DCM, which may be the case where FBCM is larger than the desired switching frequency 'Fswitch_desired'. When the system tends to go to CCM, the desired switching frequency 'Fswitch_desired_out' may not attain the desired frequency for entering CCM. The system can be then limited at 'DCM only' with a margin as set by the input 'b'.

Figure 24:
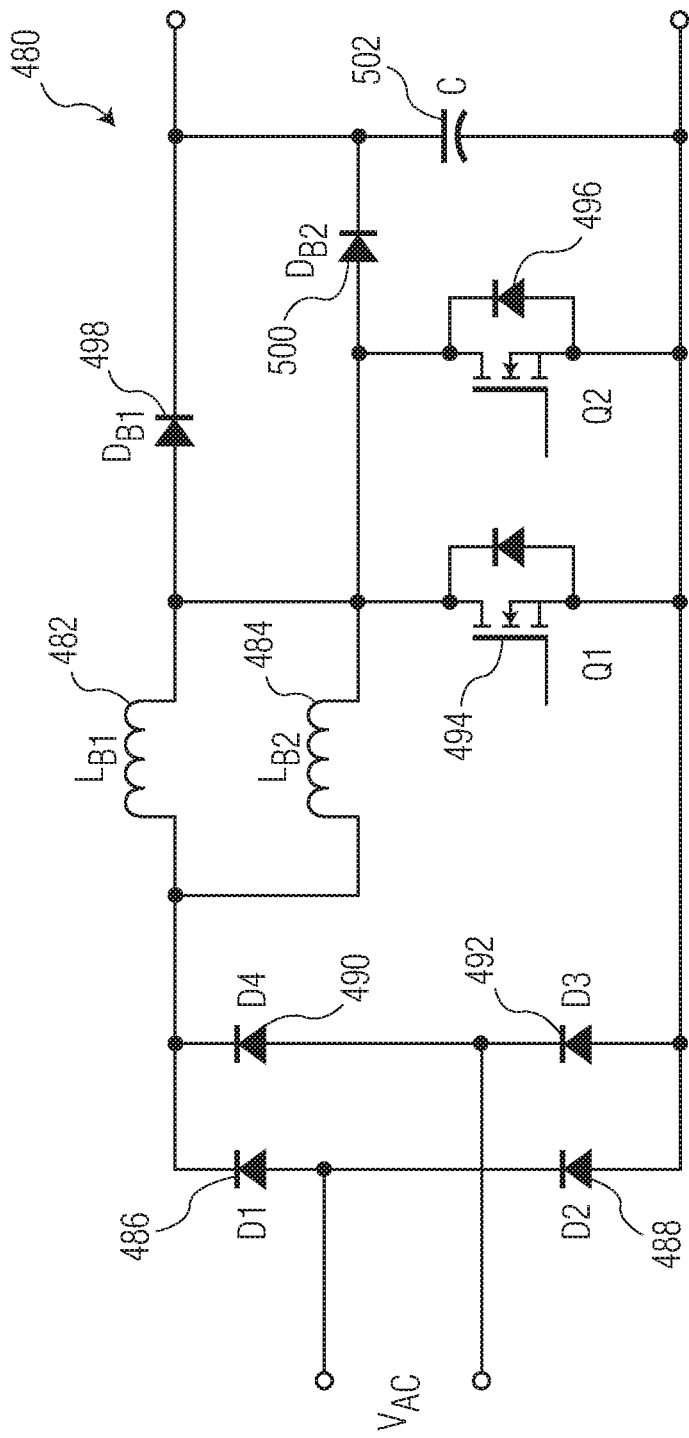
FIG. 24 depicts a schematic circuit diagram of an interleaved PFC circuit.
Figure 25:
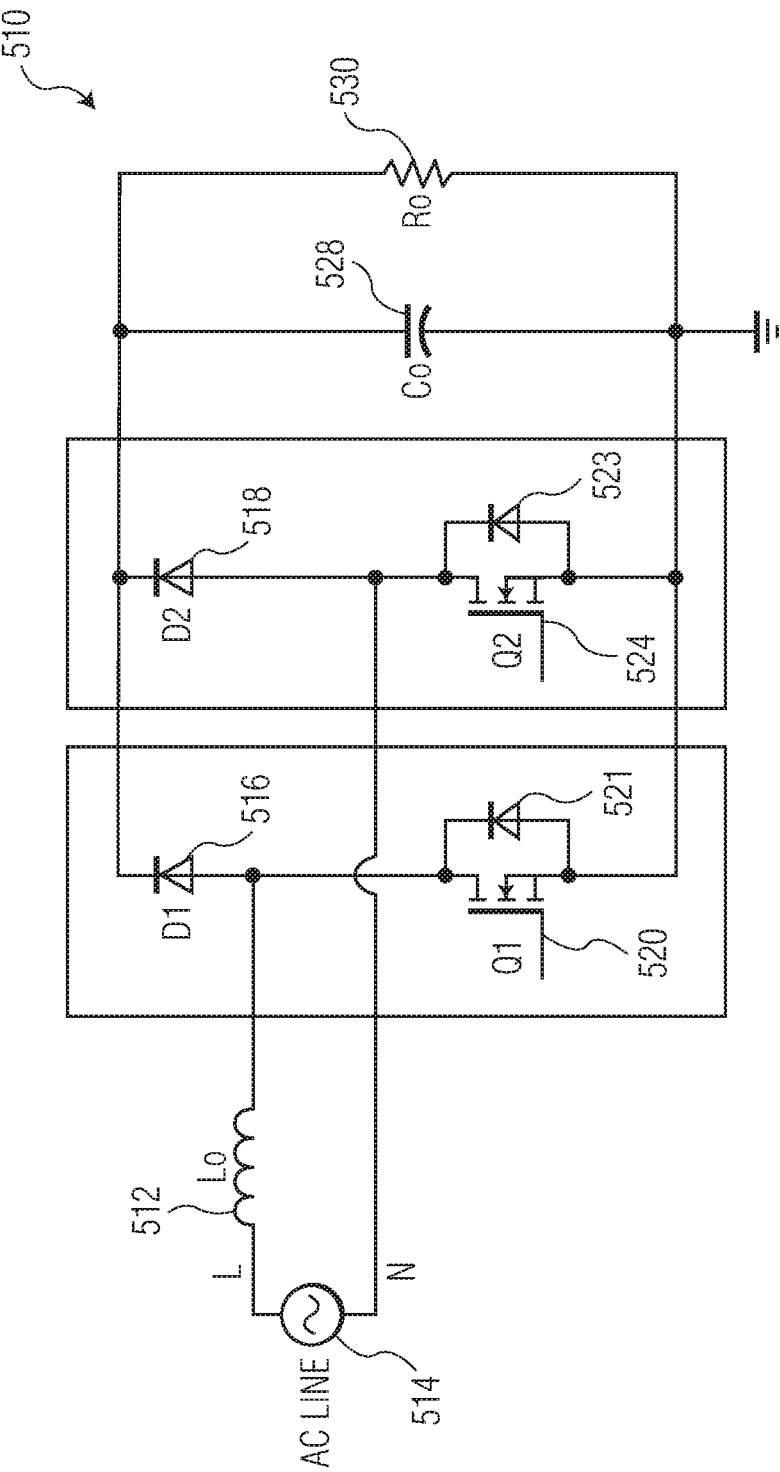
FIG. 25 depicts a schematic circuit diagram of a bridgeless boost PFC circuit.

Beside standard power factor corrector applications, the disclosed embodiments can be used in combination with other power factor corrector topologies such as, for example, an interleaved power factor corrector or a bridgeless boost power factor corrector, which are respectively shown in FIGS. 24 and 25.

FIG. 24 depicts a schematic circuit diagram of an interleaved power factor corrector 480. The power factor corrector 480 can include an inductor 482 ($L_{B1}$) and an inductor 484 ($L_{B2}$) electronically in parallel with one another. The inductor 482 can be coupled to a diode 498 ($D_{B1}$) and a transistor 494 (Q1). The inductor 484 can be coupled to a transistor 496 (Q2) and a diode 500 ($D_{B2}$). The diode 498 and the diode 500 can be further coupled to a capacitor 502. The transistors 494 and 496 can also connect to the capacitor 502. The power factor corrector 480 can further include a diode 486 (D1) and a diode 490 (D4) along with a diode 488 (D2) and a diode 492 (D3).

The diode 486 and the diode 490 can be coupled to the inductor 482 and the inductor 484. The diode 488 and the diode 492 can connect respectively to the diode 486 and the diode 490, and also to one another and to the transistors 494, the transistor, 496 and the capacitor 502. The voltage $V_{AC}$ can be input at the interface between the diode 486, the diode 488, the diode 490, and the diode 492 as shown in FIG. 24. The output of the power factor corrector 480 can be obtained at the capacitor 502.

FIG. 25 depicts a schematic circuit diagram of a bridgeless boost power factor corrector 510 that can include a diode 516 ("D1") and a diode 518 ("D2"), which can be coupled to one another and to a capacitor 528 ("Co") and a resistor 530 ("Ro"). The capacitor 528 and the resistor 530 can be arranged in parallel with one another in the bridgeless boost power factor corrector circuit 510. A transistor 520 (Q1) can be configured in parallel with a diode 521, and a transistor 524 (Q2) can be arranged in parallel with a diode 523.

The diode 516 can be coupled to the transistor 520 and to the diode 521, while the diode 518 can be coupled to the transistor 524 and to the diode 523. The bridgeless boost power factor corrector 510 can further include an inductor 512 ("Lo") that can connect to the diode 516, the transistor 520 and the diode 521, and can also connect to an AC voltage source 514 ("AC Line"). The diode 518 can be further coupled to the transistor 524 and the diode 523, and also to the AC voltage source 514. For topologies of the power factor corrector 480 and the bridgeless boost power factor corrector 510, it may be possible to sense the inductor current in a manner to that found in a standard power factor corrector, but with the disclosed approach implemented for controlling the power.

It can be appreciated that the peak current 'Ipeak' can become more difficult to set when the input voltage may be close to 0 as can occur around the mains zero-crossing. The reason is that 'Ipeak' can become very low and issues may occur with switching noise, offsets etc. Therefore, a wider implementation of the 'Ipeakh' feature can be used to solve issues close to the mains zero-crossing by replacing 'Ipeak' by 'Ton'.

Close to the zero-crossings of the mains, the disclosed power factor corrector can function in a DCM operation. Then, the power factor corrector switch on time (Ton) can be proportional to peak current 'Ipeak' and reversely proportional to the input voltage (Vin) and can scale with the power factor corrector inductor value ('Lind'). Due to this relation, 'Ton' can be quite large and well defined due to the 1/Vin relation:

$$Ton = \frac{Lind}{Vin} Ipeak.$$

Thus, the value of the peak input current 'Ipeak' can be set, and the corresponding value of 'Ton' calculated. The actual Ton can be set for a primary stroke using the calculated value of 'Ton'.

Basically the inductor current can become slightly negative after the end of a secondary stroke, especially at a low input voltage (e.g., around Vin=50V) so then we can then refer to an 'effective' value of 'Ton' as the part of 'Ton' after the inductor current has become positive. In other words, the basic concept is that the 'Ton' (effective) can be used instead of 'Ipeak' as a corresponding variable to set the value of the desired input variables close to the zero-crossings of the mains and the required 'Ton' can be calculated as a function of the 'Ipeak' value.

Figure 26:
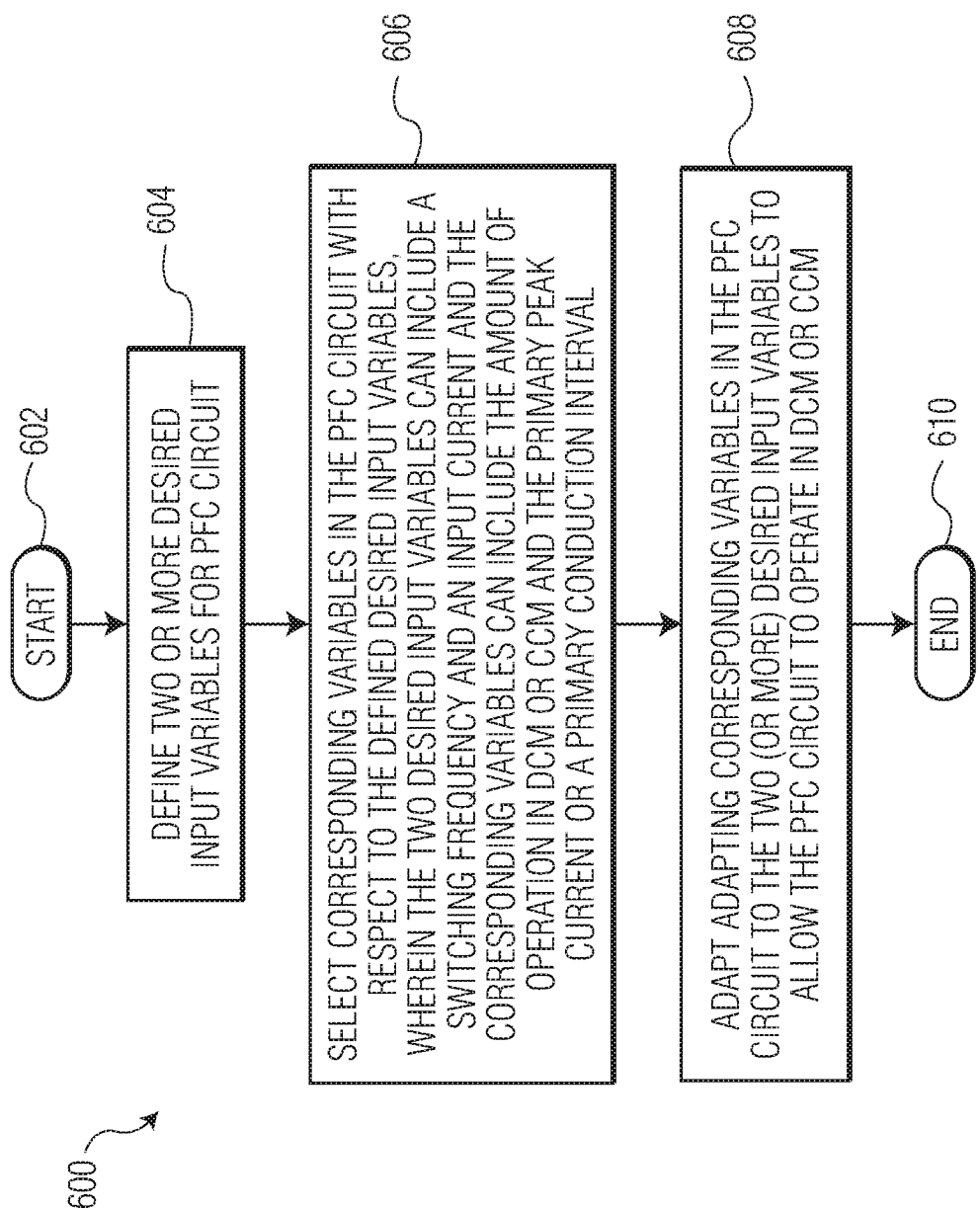
FIG. 26 depicts a flow chart of operations illustrating a method of operating a PFC circuit.

FIG. 26 depicts a flow chart of operations illustrating a method of operating a power factor corrector. As indicated at block 602, the process can be initiated. Thereafter, as shown at block 604, two or more desired input variables can be defined for a power factor corrector. Then, as shown at block 606, corresponding variables in the power factor corrector can be selected with respect to the two or more desired input variables defined for the power factor corrector. The two desired input variables can include a switching frequency and an input current and the corresponding variables can include the amount of operation in DCM or CCM and the primary peak current or a primary conduction interval. Then, as shown at block 608, the corresponding variables in the power factor corrector can be adapted to the two (or more) desired input variables so as to allow the PFC circuit to operate in DCM or CCM, as discussed previously.

As discussed previously, the amount of operation in DCM or CCM may be equal to the ratio 'a'. Additionally, the primary peak current can be used as the corresponding variable outside a region around the mains zero-crossing, and 'Ton' can be used within a region around the mains zero-crossing. In addition, the part of the 'Ton' where a positive inductor current can occur ('Ton_effective') can be scaled to 'Ipeak" by an adaptively determined factor.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations and elements for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention and elements thereof may be implemented entirely in hardware or in an implementation containing both hardware and software elements. In embodiments that use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A circuit, comprising:
   a power factor corrector,
   wherein at least two input variables are defined for the power factor corrector; and
   a processor that communicates with the power factor corrector, and which selects variables in the power factor corrector with respect to the at least two input variables defined for the power factor corrector,
   wherein
   the at least two input variables include a switching frequency (Fswitch) and an input current; and
   the variables include an amount of operation in a conduction mode and at least one of a primary peak current (Ipeak) and a primary conduction interval, and
   wherein the variables in the power factor corrector are adapted to the at least two input variables to allow the power factor corrector to operate in an operating mode that includes the conduction mode;
   wherein the conduction mode includes a DCM (Discontinuous-Conduction Mode) and a CCM (Continuous-Conduction Mode); and
   wherein the switching frequency (Fswitch) for both the DCM and the CCM is defined by a same equation.

2. The circuit of claim 1 wherein the primary peak current is utilized as a corresponding variable external to a region near a mains zero-crossing.

3. The circuit of claim 1 wherein a Ton (Timer On) control parameter is utilized within a region near a mains zero-crossing.

4. The circuit of claim 3 wherein at least a part of the Ton control parameter related to a positive inductor current is scaled to the primary peak current by an adaptively determined factor.

5. The circuit of claim 1 wherein:
   the primary peak current is utilized as a corresponding variable external to a region near a mains zero-crossing; and
   a Ton (Timer On) control parameter is utilized within a region near the mains zero-crossing.

6. The circuit of claim 1 wherein the power factor corrector circuit comprises a boost converter.

7. The circuit of claim 1 wherein the power factor corrector circuit comprises a bridgeless power factor corrector circuit.

8. The circuit of claim 1:
   wherein Fswitch=Fbcm/a;
   wherein "a" is a ratio between a sum of a primary stroke and a secondary stroke that is divided by a total time period equal to 1/Fswitch; and
   wherein Fbcm is a frequency that would occur if for a given Ipeak, the circuit is forced to operate in a BCM (boundary conduction mode).

9. The circuit of claim 1:
   wherein the circuit is forced to operate in the BCM when "a=1".

10. A circuit, comprising:
    a power factor corrector,
    wherein at least two input variables are defined for the power factor corrector;
    a processor that communicates with the power factor corrector, and which selects variables in the power factor corrector with respect to the at least two input variables defined for the power factor corrector,
    wherein
    the at least two input variables include a switching frequency (Fswitch) and an input current and
    the variables include an amount of operation in a conduction mode and at least one of a primary peak current and a primary conduction interval; and
    a switching converter unit that communicates with the processor and which adapts the variables in the power factor corrector to the at least two input variables to allow the power factor corrector to operate in an operating mode that includes the conduction mode,
    said conduction mode including a DCM (Discontinuous-Conduction Mode) and a CCM (Continuous-Conduction Mode);
    wherein the switching frequency (Fswitch) for both the DCM and the CCM is defined by a same equation.

11. The circuit of claim 10 wherein:
    the primary peak current is utilized as a corresponding variable external to a region near a mains zero-crossing; and
    a Ton (Timer On) control parameter is utilized within a region near the mains zero-crossing.

12. A method of operating a circuit, comprising:
    defining at least two input variables for a power factor corrector;
    selecting variables in the power factor corrector with respect to the at least two input variables defined for the power factor corrector,
    wherein the at least two input variables include a switching frequency (Fswitch) and an input current and the variables include an amount of operation in a conduction mode and at least one of a primary peak current and a primary conduction interval; and adapting the variables in the power factor corrector to the at least two input variables to allow the power factor corrector to operate in an operating mode that includes the conduction mode;

wherein the conduction mode includes a DCM (Discontinuous-Conduction Mode) and a CCM (Continuous-Conduction Mode);

wherein the switching frequency (Fswitch) for both the DCM and the CCM is defined by a same equation.

13. The method of claim 12 further comprising:
utilizing the primary peak current as a corresponding variable external to a region near a mains zero-crossing.

14. The method of claim 12 further comprising
utilizing a Ton (Timer On) control parameter within a region near a mains zero-crossing.

15. The method of claim 14
wherein at least a part of the Ton control parameter related to a positive inductor current is scaled to the primary peak current by an adaptively determined factor.

16. The method of claim 12 further comprising:
utilizing the primary peak current as a corresponding variable external to a region near a mains zero-crossing; and
utilizing a Ton (Timer On) control parameter within a region near the mains zero-crossing.

17. The method of claim 12
wherein the power factor corrector comprises a boost converter.

18. The method of claim 12
wherein the power factor corrector comprises a bridgeless power factor corrector.

* * * * *